United States Patent
Ishii et al.

(10) Patent No.: US 7,379,211 B2
(45) Date of Patent: May 27, 2008

(54) IMAGE PROCESSING METHOD AND IMAGE PROCESSING APPARATUS

(75) Inventors: Akira Ishii, Nakai-machi (JP); Kenji Ogi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 777 days.

(21) Appl. No.: 10/393,327

(22) Filed: Mar. 20, 2003

(65) Prior Publication Data

US 2003/0231348 A1    Dec. 18, 2003

(30) Foreign Application Priority Data

Mar. 20, 2002  (JP)  .............................. 2002-078249
Nov. 14, 2002  (JP)  .............................. 2002-330217

(51) Int. Cl.
  *H04N 1/40*  (2006.01)
(52) U.S. Cl. ..................................... 358/3.03; 358/3.26
(58) Field of Classification Search ............... 358/3.03, 358/299, 3.01, 3.05, 3.04, 3.21, 3.22, 3.26, 358/1.9; 382/267, 268
See application file for complete search history.

(56) References Cited

U.S. PATENT DOCUMENTS

| 4,800,442 A |  | 1/1989 | Riseman et al. |
| 6,778,299 B2 * | 8/2004 | Lin et al. | 358/3.03 |
| 6,962,400 B2 * | 11/2005 | Minnebo et al. | 358/3.03 |
| 2005/0017999 A1 * | 1/2005 | Yoshida | 347/6 |

FOREIGN PATENT DOCUMENTS

| JP | SHO 53-19201 | 2/1978 |
| JP | HEI 1-058915 | 12/1989 |
| JP | HEI 6-66873 | 8/1994 |
| JP | 2532398 | 6/1996 |
| JP | 2664173 | 6/1997 |
| JP | 2000-138829 | 5/2000 |

OTHER PUBLICATIONS

R. Floyd &L. Steinberg, "An Adaptive Algorithm for Spatial Grey Scale", SID 75 Digest, pp. 36-37.
The Institute of Image Electronics Engineers of Japan draft Jul. 2, 1985, Tomoaki Tanaka et al., Electronic Photo Recording by Use of Elliptic Beams.

* cited by examiner

*Primary Examiner*—Kimberly A. Williams
(74) *Attorney, Agent, or Firm*—Fildes & Outland, P.C.

(57) ABSTRACT

An image processing method that puts input image data represented by multi-value pixels into gradation representation of dots having binary data of plural minute pixels while performing error diffusion processing. The method includes a first step that when a dot is formed which corresponds to correction image data produced by adding correction data to multi-value image data of a multi-value target pixel, only in the case where the dot is to be formed so as to be adjacent to a dot formed for a proper adjacent multi-value pixel, forms the dot even if it has less than k (2 or greater integer) number of minute pixels. In other cases, the method forms only a dot having k number of minute pixels or more.

19 Claims, 22 Drawing Sheets

SUB-DOT CREATION
17-VALUE ERROR DIFFUSION
AND ARRANGEMENT CONTROL

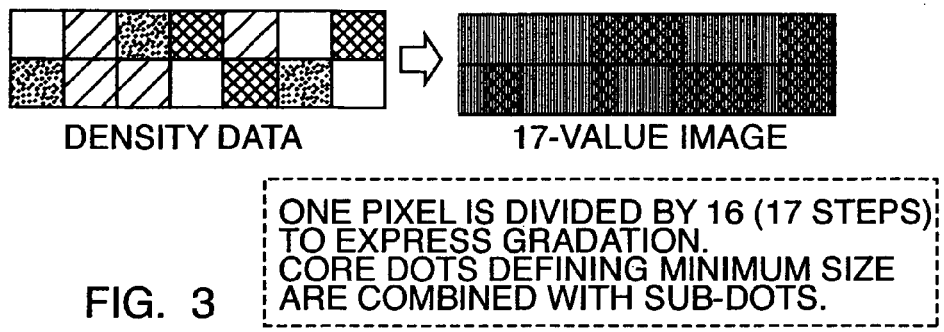
DENSITY DATA → 17-VALUE IMAGE
FIG. 3  ONE PIXEL IS DIVIDED BY 16 (17 STEPS) TO EXPRESS GRADATION. CORE DOTS DEFINING MINIMUM SIZE ARE COMBINED WITH SUB-DOTS.
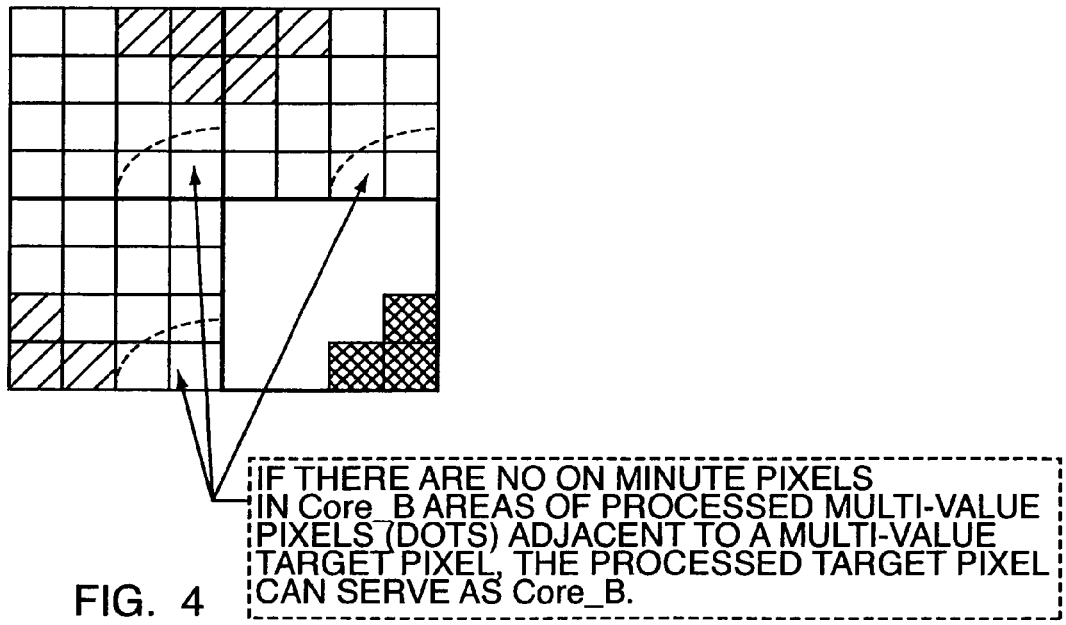
FIG. 4  IF THERE ARE NO ON MINUTE PIXELS IN Core_B AREAS OF PROCESSED MULTI-VALUE PIXELS (DOTS) ADJACENT TO A MULTI-VALUE TARGET PIXEL, THE PROCESSED TARGET PIXEL CAN SERVE AS Core_B.

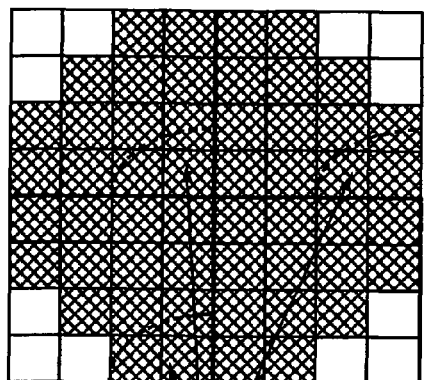
FIG. 7 IF THERE ARE NO OFF MINUTE PIXELS IN PROPER AREAS OF PROCESSED MULTI-VALUE PIXELS (DOTS) ADJACENT TO A MULTI-VALUE TARGET PIXEL, THE PROCESSED TARGET PIXEL CAN SERVE AS Core_W.
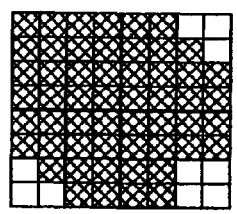
FIG. 8A
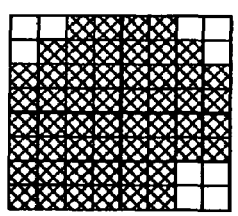
FIG. 8B
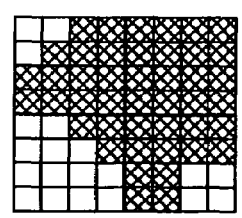
FIG. 8C
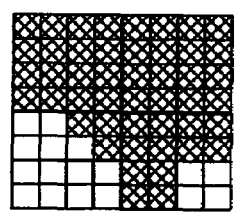
FIG. 8D
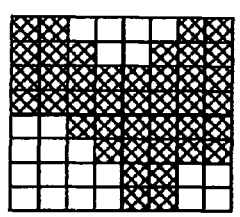
FIG. 8E
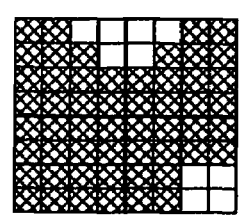
FIG. 8F LOW-DENSITY AREA Core_B
(E.G., 0 TO 20% DENSITY)

MIDDLE-DENSITY AREA Core_B
(E.G., 20 TO 50% DENSITY)

HIGH-DENSITY AREA Core_B
(E.G., 50 TO 100% DENSITY)

IMAGE PROCESSING METHOD AND IMAGE PROCESSING APPARATUS

BACKGROUND OF THE INVENTION

1. Field of the Invention

The present invention relates to an image processing method and an image processing apparatus. More particularly, in the fields of laser beam printer and printing plate making apparatus, the present invention relates to an image processing method for putting input image data represented by multi-value pixels into gradation representation by binary data of plural minute pixels while being subjected to error diffusion processing, and an image processing apparatus for executing the processing method.

2. Description of the Related Art

In the fields of laser beam printer, ink jet printer, and printing plate making apparatus, an area gradation method and stochastic half toning technology are known as methods for reproducing the density gradation of color-separated multi-value image data. The former represents density gradation by the magnitude of collections (clusters) of binary dots, and the latter visually represents density gradation by the roughness and fineness of binary dots.

As the area gradation method of the former, a dither matrix (concentrated dither) method is known. According to this method, with regular grid points as base points, dot areas are modulated while minute dots are being colored according to an image density. On the other hand, as the stochastic half toning technology of the latter, an error diffusion method is known. According to this method, while each multi-value pixel is binarized by predetermined threshold values, binarization errors are diffused to unprocessed adjacent multi-value pixels to macroscopically preserve density information (non-patent document 1, for example).

Since the dither matrix method performs binarization processing while comparing predetermined threshold values and input image data on a multi-value pixel basis, satisfaction of both gradation properties and resolution requires sufficiently high resolution of the binarization processing and a large size of dither matrix. Regular binary dot arrangement poses the problems of color moire of secondary and tertiary colors and document moire.

On the other hand, the error diffusion method, in which binarized threshold values do not rely on multi-value pixel positions unlike dither matrix, has the characteristics of easy adaptation to an image structure of input image data because of low periodicity of dot structure and macroscopic preservation of density information, and satisfies both gradation properties and resolution and effectively prevents the occurrence of moire pattern.

However, the error diffusion method has had problems in that, if specific data is continuously inputted, diffusion errors have periodicity, as a result of which specific textures occur or stripe-like noise called worm noise mingles. These problems have been conventionally solved by using technology for adding random number data to diffusion errors (patent document 1, for example), and technology for switching factors to be multiplied by diffusion errors in various ways (patent document 2, for example).

FIG. 20 is a schematic diagram showing a binarized image produced by binary error diffusion processing according to the related art of the former. FIG. 21 is a schematic diagram showing a binarized image produced when, with a 2-by-2 bitmap allocated to a multi-value pixel, binary error diffusion processing, that is, high-resolution error diffusion processing is performed on a minute pixel basis. Particularly in an ink jet printer, high quality images can be produced using such a high-resolution error diffusion processing method.

Laser printers employing electrophotographic processes have the restriction of slow-scan resolution of scan beam and therefore a method for achieving high resolution only in a fast-scan direction has been conventionally used (non-patent document 2, for example). In such a recording system, multi-value error diffusion as shown in FIG. 22 can be used. According to the multi-value error diffusion method, one multi-value pixel is equally divided by eight so that it can be represented by nine values. Specifically, each multi-value pixel is made dense by n/8 according to density thereof and an error from an input value is diffused to peripheral pixels, where n is 0, 1, 2, . . . .

In this connection, although the error diffusion method is frequently used in ink jet printers and satisfactorily provides its gradation reproduction effects, in actual situation, it is not so frequently used in later printers in which the dither matrix method and the analog line screen method are dominant (patent documents 3 and 4, for example).

This is because since spatial frequency responses as well as MTF (Modulation Transfer Function) of photosensitive materials deteriorate in electrophotographic processes such as exposure, development, transfer, and fixing, even if an image structure arranged finely with minute dots as shown in FIGS. 21 and 22 is inputted as a recording signal, reproducibility becomes unstable and washout and blocks occur, resulting in the lack of satisfactory gradation representation.

On the other hand, since the dither matrix method and the analog line screen method expand dots at proper locations according to density, stresses on spatial frequencies do not change greatly in density areas, and the number of lines of dots may be set according to the responsibility of printer, so that gradation can be represented by changes in dot area. Therefore, the dither matrix method and the analog line screen method presuppose dot processing in an output part and perform pre-processing such as spatial frequency filter processing for image data to avoid interference with the dot processing.

Technology taking advantage of the characteristics of dot area modulation and the characteristics of error diffusion processing is proposed (patent documents 5 and 6, for example).

According to the technology disclosed in patent document 5, if correction image data (input image data containing added error values) is less than a value corresponding to a reproducible minimum dot size, dots are not generated and an error value is diffused to the periphery, and if the correction image data is equal to or greater than the value corresponding to the reproducible minimum dot size, a dot of a size corresponding to the correction image data is formed and error data is zeroed.

The following technique is disclosed in patent document 6. According to the technique, to prevent washout and blocks, the sizes of dots created by error diffusion processing are subjected to pulse width modulation by density around a multi-value target pixel so that low densities are widely modulated and high densities are narrowly modulated.

[Patent document 1]

Japanese Published Examined Patent Application No. Hei 1-058915

[Patent document 2]

Japanese Published Examined Patent Application No. Hei 6-66873

[Patent document 3]
Japanese Patent No. 2532398
[Patent document 4]
Japanese Published Unexamined Patent Application No. Sho 55-19201
[Patent document 5]
Japanese Patent No. 2664173
[Patent document 6]
Japanese Published Unexamined Patent Application No. 2000-138829
[Non-patent document 1]
R.FLOYD&L.STEINBERG, "An Adaptive Algorithm for Spatial Grey Scale", SID 75 DIGEST, PP 36-37
[Non-patent document 2]
The Institute of Image Electronics Engineers of Japan draft Jul. 2, 1985, Tomoaki Tanaka et al., "Electronic Photo Recording by Use of Elliptic Beams"

Generally, error diffusion processing is characterized by a dispersed dot structure and is technology that cannot be used without performing processing so that a uniform structure does not appear for a specific image density as described previously. If this processing is insufficient, dispersed structures are interspersed with regular structures, making texture change conspicuous and making the image ugly. In this connection, according to the related art disclosed in patent document 5, error diffusion processing is performed only in highlight portions, and in portions equal to or greater than a specific density, error diffusion processing is not performed and PWM (pulse width modulation) is performed on a multi-value pixel basis, as a result of which an image of line screen structure is produced. Accordingly, an image rich in gradation change, when outputted, becomes ugly because structure change is conspicuous in the vicinity of switching areas.

The error diffusion processing preserves densities, while, in the technology disclosed in patent document 6, since dot sizes are modulated after processing, areas in which density information is not preserved come into existence, with the result that mismatch occurs between diffused density errors and a reproduced image. As a result, gradation jump and density reversal may occur in boundaries between portions subjected to pulse width modulation and portions not subjected to pulse width modulation (PWM).

SUMMARY OF THE INVENTION

The present invention has been made in view of the above problems and provides an image processing method and an image processing apparatus for executing the processing method that can provide the advantages of the error diffusion method such as excellent adaptation to dispersed dot structures and input images and excellent gradation capability resulting from density preservation, by making use of gradation reproducibility by dot area modulation in marking technology utilizing processes that are excellent in adaptation to dot area modulation but are strict with reproducibility of images interspersed with minute dots, such as electronic photo process and printing.

In putting input image data represented by multi-value pixels into gradation representation by binary data of plural minute pixels while performing error diffusion processing, the image processing apparatus according to the present invention, when a dot is formed which corresponds to correction image data produced by adding correction data to the multi-value image data of a multi-value target pixel, only in the case where the dot is to be formed so as to be adjacent to a dot formed for a proper adjacent multi-value pixel, forms the dot even if it has less than k (2 or greater integer) number of minute pixels, and in other cases, forms only dots having k number of minute pixels or more, and calculates an error between a density of the formed dot and the density of the correction image data and uses the density error information as the correction data of peripheral multi-value pixels. The image processing apparatus sequentially performs the above processing for each of processing multi-value pixels.

In short, according to the present invention, in marking technology utilizing processes that are excellent in adaptation to dot area modulation but are strict with reproducibility of images interspersed with minute dots, such as electronic photo process and printing, while a dot (hereinafter described as core dot (a collection of plural minute pixels of a minimum unit each)) to serve as a base point for starting dot reproduction is controlled to be equal to or greater than a predetermined size, binarization processing is performed by the error diffusion method, and further according to core dot creation situations and image data densities, dots of a minimum unit (hereinafter described as sub-dots) are arranged adjacent to the core dot, whereby dot area modulation is performed. In sub-dot creation, an error between the density of the multi-value target pixel and the density of a binarized dot is diffused to subsequent processing multi-value pixels. This provides the advantages of the error diffusion method such as excellent adaptation to dispersed dot structures and input images, and excellent gradation capability resulting from density preservation.

BRIEF DESCRIPTION OF THE DRAWINGS

Preferred embodiments of the present invention will be described in detail based on the followings, wherein:

FIG. 3 is a drawing showing a pattern output example of two-stage multi-value error diffusion;

FIG. 4 is a drawing showing a pattern example of Core_B dot in 4 by 4 minor dot configuration;

FIG. 7 is a drawing showing a pattern example of Core_W dot in 4 by 4 minor dot configuration;

FIGS. 8A to 8F are drawings showing other pattern examples of Core_W dot in 4 by 4 minor dot configuration;

DESCRIPTION OF THE PREFERRED EMBODIMENTS

Hereinafter, embodiments of the present invention will be described in detail with reference to the accompanying drawings.

First Embodiment

Figure 1:
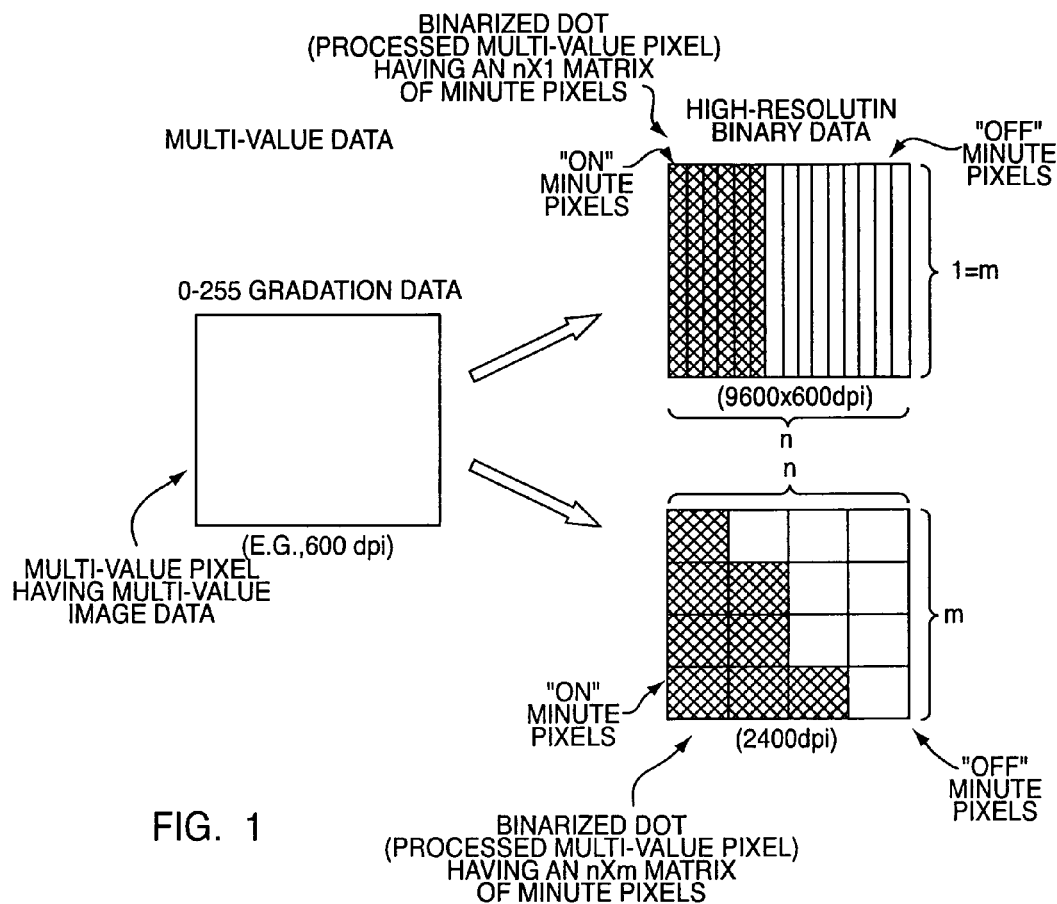
FIG. 1 is a drawing for explaining a high-resolution recording method.

Although a resolution of about 300 to 600 dpi generally suffices for multi-value representation of an image, i.e., multi-value pixels, a bitmap image of higher resolution must be used to reproduce the image in a binary image. For example, as shown in FIG. 1, bitmap images constituted by minute pixels such as 2,400×2,400 dpi or 9,600×600 dpi must be used. Herein, a description is made of an example of conversion of an inputted multi-value image of 600 dpi into a binary image of 9,600×600 dpi, which is 16×1 times 600 dpi.

An image processing method according to a first embodiment handles a binary image corresponding to one multi-value pixel as a dot (or processed multi-value pixel) having a matrix containing n-by-m number (n×m>1, n and m are integers, respectively) of minute pixels. n denotes the number of splits in the direction (fast-scan direction) in which a target pixel within multi-value image data is scanned, and m denotes the number of splits in a slow-scan direction orthogonal to the fast-scan direction. For a laser printer, the direction in which beams are scanned is the fast-scan direction. In binary error diffusion, an ON/OFF (colored/noncolored) check is made on a dot basis. However, in this embodiment, since colored dots are determined on a minute pixel matrix basis, multi-value error diffusion is basically performed. Hereinafter, a colored minute pixel is represented as ON and a non-colored minute pixel as OFF.

The image processing method according to the present invention, when a dot is formed which corresponds to correction image data produced by adding correction data to the multi-value image data of a multi-value target pixel, only in the case where the dot is to be formed so as to be adjacent to a dot formed for a proper adjacent multi-value pixel, forms the dot even if it has less than k (2 or greater integer) number of minute pixels, and in other cases, forms only dots having k number of minute pixels or more.

Specifically, if the value of the correction image data of a target pixel is equal to or greater than a predetermined density, a dot having k number of minute pixels or more is formed in correspondence with the target pixel to be used as a core dot to serve as a base point for starting dot reproduction; if the value of the correction image data is less than the predetermined density, only in the case where a dot is to be formed so as to be adjacent to a dot formed for a proper adjacent multi-value pixel, a dot having the number of minute pixels in accordance with core dot creation status and/or the density of the correction image data is formed to be used as a sub-dot.

In an electronic photo process, even if an image such as an error diffusion image in which minute dots are densely arranged is inputted as a recording signal, the image cannot be stably reproduced, and washouts and blocks occur, resulting in unsatisfactory gradation reproduction. Conversely, if the minute dots are too large, since they will be conspicuous, the value of k is determined to solve these problems. Specifically, depending on the characteristics of an image forming system, the value of k is preferably 8, about the half of 16 minute pixels constituting one pixel in an image forming apparatus of 9600×600 dpi, for example. k is not limited to 8 and may be set to any value of 2 or more. This value may be changed, depending on not only resolution but also a toner particle diameter, the characteristics of the image forming system, the values of the multi-value image data and the correction image data, or density area.

ON/OFF patterns of dots having an n by m minute pixel matrix are defined with at least six types as follows:
Wht (all minute pixels are turned OFF)
Blk (all minute pixels are turned ON)
Core_B (core dot, black)
Several minute pixels at proper locations are turned ON.
Core_W (core dot, white)
Several minute pixels at proper locations are turned OFF.
Sub_B (sub-dot, black)
A number of minute pixels in accordance with correction image data, including minute pixels at locations adjacent to Core_B, are turned ON.
Sub_W (sub-dot, white)
A number of minute pixels in accordance with correction image data, including minute pixels at locations adjacent to Core_W, are turned OFF.

The ON/OFF patterns of an n by m minute pixel matrix are not limited to the above-described six dot patterns; for example, for (3) and (4), the positions of colored or uncolored minute pixels may be further localized to increase the number of dot patterns.

Figure 2A:
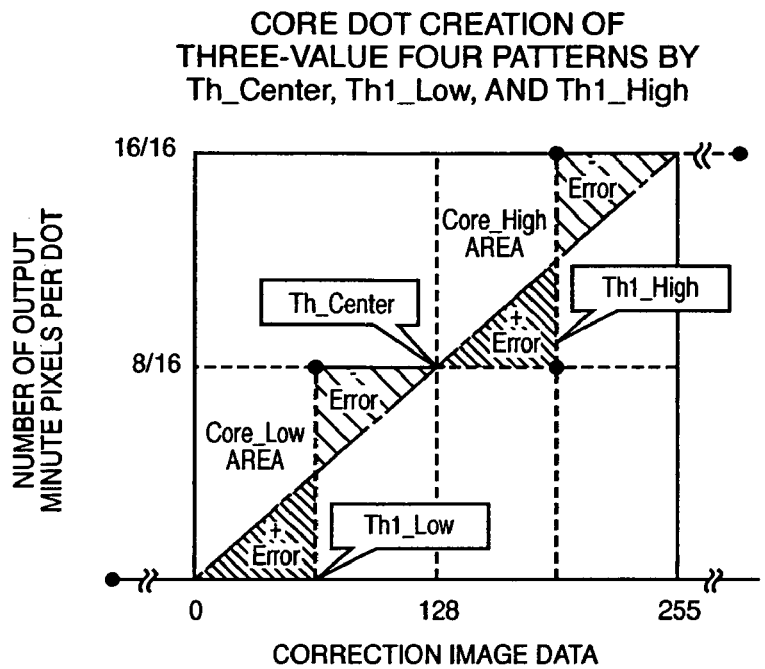
FIGS. 2A to 2D are drawings for explaining a summary of two-stage multi-value error diffusion.
Figure 2B:
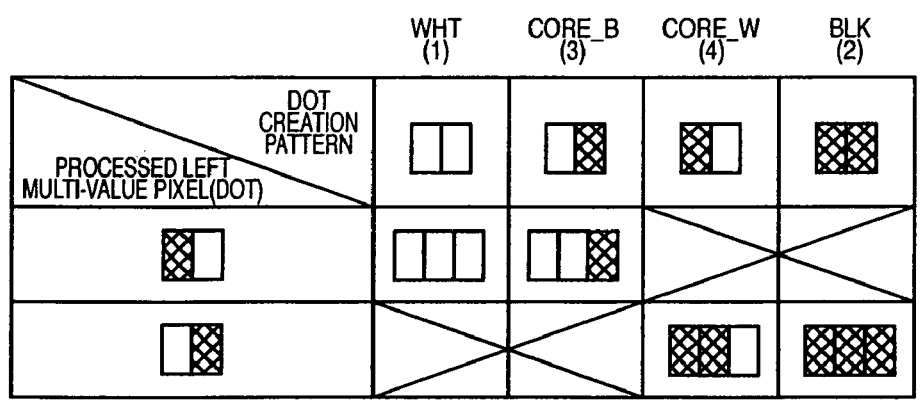
Figure 2C:
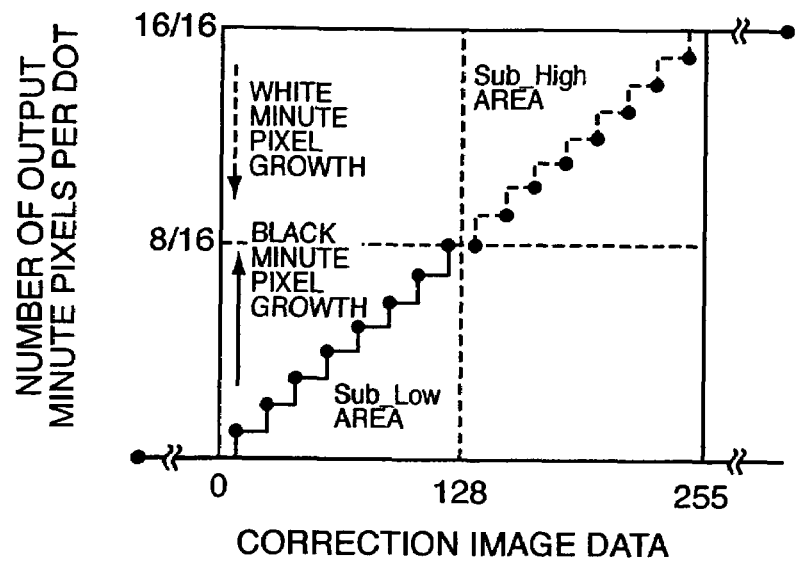
Figure 2D:
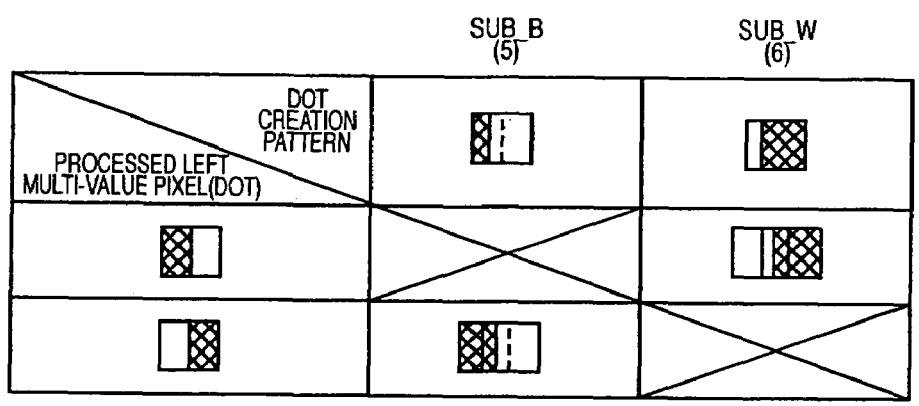
Figure 5A:
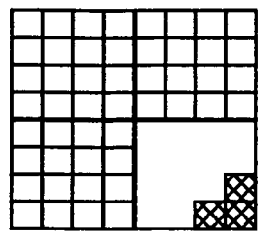
FIGS. 5A to 5K are drawings showing other pattern examples of Core_B dot in 4 by 4 minor dot configuration.
Figure 5B:
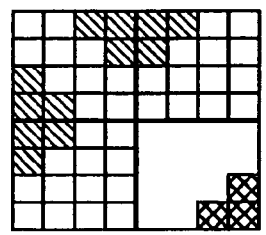
Figure 5C:
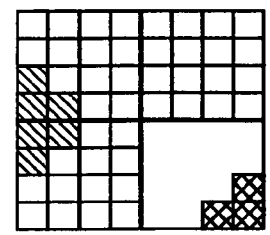
Figure 5D:
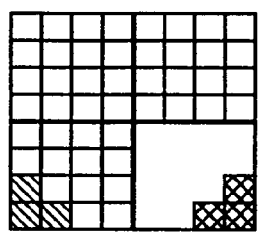
Figure 5E:
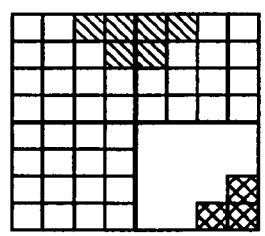
Figure 5F:
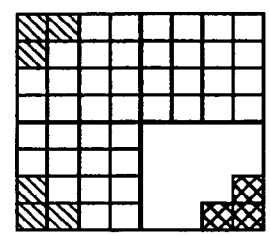
Figure 5G:
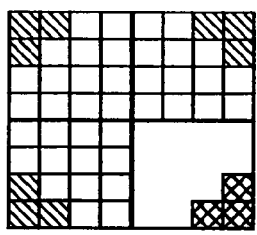
Figure 5H:
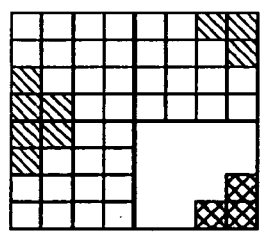
Figure 5I:
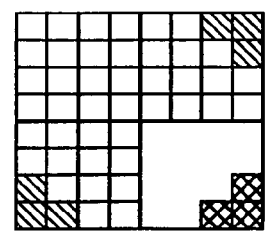
Figure 5J:
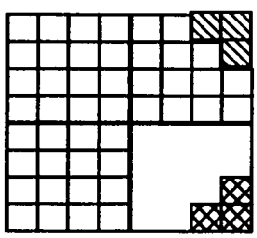
Figure 5K:
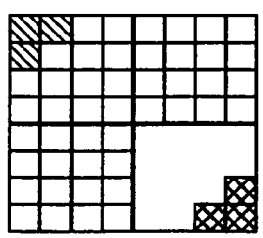

Schematic diagrams of the above six dot patterns (1) to (6) are shown correspondingly to numbers (1) to (6) in FIGS. 2B and 2D. FIGS. 2A to 2D are diagrams showing an outline (16×1) of two-stage multi-value error diffusion. In the two-stage multi-value error diffusion, a dot is determined as one of the above six dot patterns (1) to (6) from the relationship between values of correction image data to which correction data for errors from peripheral binarized dot is added to multi-value image data of the target pixel, and ON/OFF patterns of processed left multi-value pixels (dots). FIGS. 2A to 2D show different processing for cases shown below.

When the right end of a processed left multi-value pixel (dot) is OFF correction image data<Th1_Low→Wht
Th1_low≦correction image data<Th_Center→Core_B
Th_Center≦correction data→SuB_W/left That is, in the case where the right end of a processed left multi-value pixel (dot) is OFF, when the correction image data is less than lower threshold value Th1_Low, all minute pixels are turned OFF (pattern (1)), and when the value of the correction image data is equal to or greater than the lower threshold value Th1_Low and is less than the middle threshold value Th_Center, a core dot is turned ON (pattern (3)), that is, k number of minute pixels at proper locations, e.g., eight minute pixels of a right half portion are colored.

When the value of the correction image data is equal to or greater than the middle threshold value Th_Center, a leftmost sub-dot is turned OFF (pattern (6)), that is, the number (even if less than k) of minute pixels in accordance with the density of the correction image data from the left end of a colored dot, including a minute pixel at a location adjacent to a left white dot are made uncolored. Conversely, more than k number of minute pixels in accordance with the density of the correction image data from the right end are colored.

When the right end of a processed left multi-value pixel (dot) is ON correction image data<Th_Center→SuB_B/left Th_Center≦correction image data<Th_High→Core_W Th_High≦correction data→Blk In the case where the right end of a processed left multi-value pixel (dot) is ON, when the value of the correction image data is less than the middle threshold value Th_Center, a left sub-dot is turned ON (pattern (5)), that is, the number (even if less than k) of minute pixels in accordance with the density of the correction image data from the left end of an uncolored dot, including a minute pixel at a location adjacent to a left colored dot are colored. When the value of the correction image data is equal to or greater than the middle threshold value Th_Center and is less than the upper threshold value Th1_High, a core dot is turned OFF (pattern (4)), that is, k number of minute pixels at a proper location of a coloreddot, for example, eight minute pixels at the right half thereof are made uncolored. Conversely, minute pixels at the left half thereof are colored. When the correction image data is equal to or greater than the upper threshold value Th1_High, all minute pixels are turned ON (pattern (2)).

As implied from the above, in the case of a core dot, regardless of the density of correction image data of a target pixel, k number of minute pixels or more, the half of 16 minute pixels in this example, are arranged at the right or left side of the pixel (three-value error diffusion). A core dot is formed toward a multi-value pixel to be processed later (the downstream side of processing direction), for example, a right or left dot. A sub-dot is formed so that black or white minute pixels collect in it. Specifically, the sub-dot is formed so that black minute pixels collect in it when the value of the multi-value image data (or the correction image data) is a low density, and it is formed so that white minute pixels collect when a high density. In the case of a sub-dot, the correction image data of a target pixel is quantized to 17 steps and as many minute pixels as the number of steps are arranged at a location adjacent to the core dot (17-value error diffusion).

After the dot pattern of a target pixel is decided, a density represented by minute pixels turned ON within one dot and the correction image data are compared to calculate a density error, which is successively temporarily stored as density error information. Density error information at a specific location from a next target pixel is multiplied by a weighting factor corresponding to its relative position to produce correction data of the next multi-value target pixel. The address of the target pixel is updated to repeat the same processing.

Although correction image data containing an error may take values of less than 0 or values of 256 or greater, there is no contradiction in the above-described conditions if the number 0 (all black) of white sub-dots is contained as SuB_W and the number 0 (all white) of black sub-dots is contained as SuB_B.

An example of a binary image subjected to such processing is shown in FIG. 3. As Core_B, the right eight of 16 minute pixels are black, and as Core_W, the right eight of 16 minute pixels are white. For this reason, as a minimum core dot in which minute pixels are collected, the size of a half dot or larger can be allocated, and sub-dots are arranged adjacent to a core dot and dot size is modulated.

As described above, according to the image processing method according to the first embodiment, in putting input image data represented by multi-values into gradation representation by binary data of plural minute pixels while performing error diffusion processing, when a dot is formed which corresponds to correction image data produced by adding correction data to the multi-value image data of a multi-value target pixel, only in the case where the dot is to be formed so as to be adjacent to a dot formed for a proper adjacent multi-value pixel, sub-dots are formed even if they have less than k number of minute pixels, and in other cases, only core dots having k number of minute pixels or more are formed. Thereby, the following effects can be obtained.

That is, while core dots to serve as base points for starting dot reproduction are controlled to be equal to or greater than a predetermined size, binarization processing is performed by the error diffusion method (multi-value error diffusion) to make sub-dots adjacent to the core dots, which are base points. As a result, since the sub-dots accompanying the core dots are dispersed throughout while being arranged somewhat irregularly, satisfactory gradation reproduction can be achieved. One dot may become larger than one multi-value pixel as a result of dot area modulation (size modulation). If dots larger in size than one multi-value pixel are arranged, the dot density becomes lower because of a lower repetition cycle than with arrangement of dots of one multi-value pixel size in the same area, as a result of which it can be prevented that dots become highly dense, and the problems of the related art can be solved, such as washout and block that occur as a result of unstable reproducibility caused by highly dense small dots.

By forming core dots toward multi-value pixels to be processed later as dots, an operation effect by sub-dot formation, that is, satisfactory gradation reproduction by dot size modulation can be obtained because sub-dots can be arranged at optimum locations adjacent to the core dots. Since error diffusion processing is performed during creation of core dots and sub-dots, density preservability can also be assured. Moreover, by changing the size of core dot as a parameter, binarized images of a dot size structure suitable for the characteristics of output equipment can be easily created.

Adding random number data, as well as correction image data, to the image data of a multi-value target pixel makes it possible to prevent the occurrence of a regular structure (texture noise) in specific image data. The random number data to be added may be limited in range or may not be added, depending on multi-value image data and/or correction image data. Th1_Low, Th_Center, and Th1_High may be made changeable, changed randomly, or changed at a predetermined ratio, depending on multi-value image data and/or correction image data. As a result, the same effect as adding random data can be obtained and a sense of incongruity caused by a concentration change of ON-minute pixels in density areas can be prevented.

Second Embodiment

In the image processing method according to the first embodiment, inputted multi-value image data of 600 dpi was converted into a binary image of 9,600×600 dpi, which is 16×1 times 600 dpi, while referring to a minute pixel pattern processed immediately before. In an image processing method according to this embodiment, examples of conversion into binary images of 4×4 dpi and 2,400×2,400 dpi while referring to three adjacent processed multi-value pixels, i.e., dots (left, upper, upper left) will be described.

First, a core dot of a 4×4 dot matrix is arranged in a lower right portion of the matrix. As shown in FIG. 4, each dot in the matrix includes a minute pixel pattern. If there is no minute pixel pattern corresponding to Core_B in three (left, upper, upper left) reference dots (processed multi-value pixels) adjacent to a target pixel, that is, if there are no minute pixels turned ON in Core_B, the target pixel can serve as Core_B.

In this connection, the following representation is satisfied: Th1_Low≦correction image data<Th_Center→Core_B. As shown in the target pixel shown in FIG. 4, a proper number of minute pixels (three in this example) in the lower right corner are turned ON as Core_B. Although a Core_B pattern is shown as an example in the drawing, by what pattern Core_B is set should be decided according to the characteristics of the system. FIGS. 5A to 5K show other generation pattern examples of Core_B.

Figure 6B:
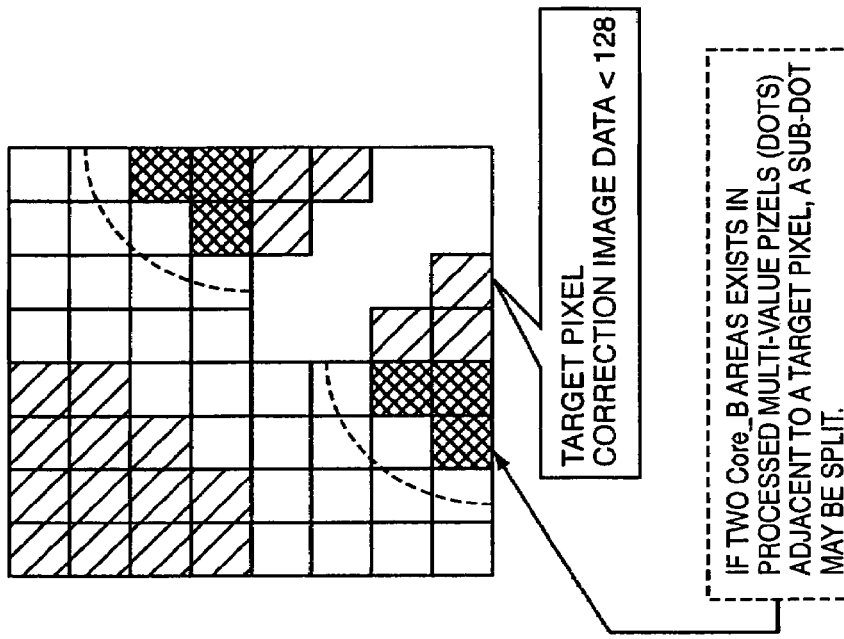
FIGS. 6A and 6B are drawings showing an example of SuB_B in 4 by 4 minor dot configuration.
Figure 6A:
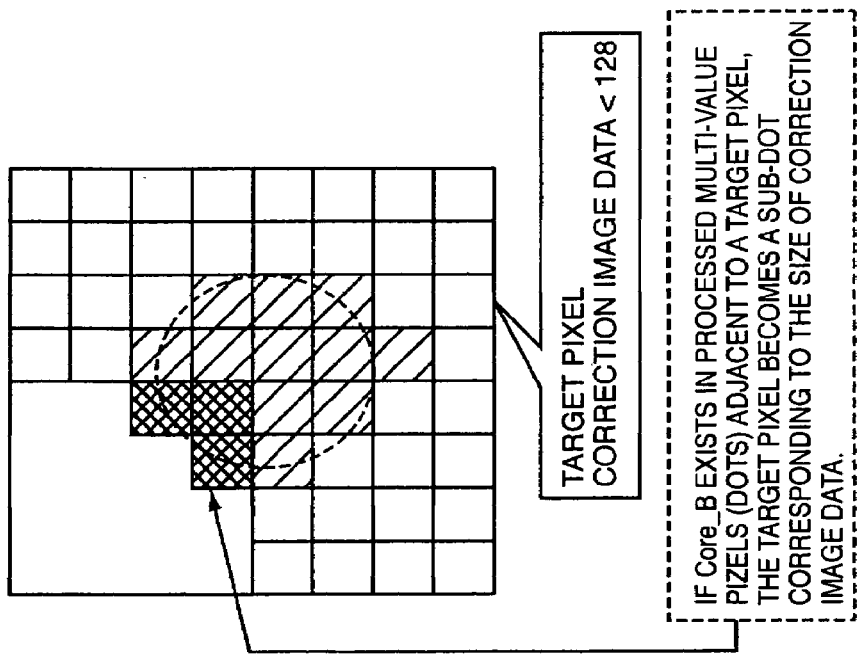
Figure 9A:
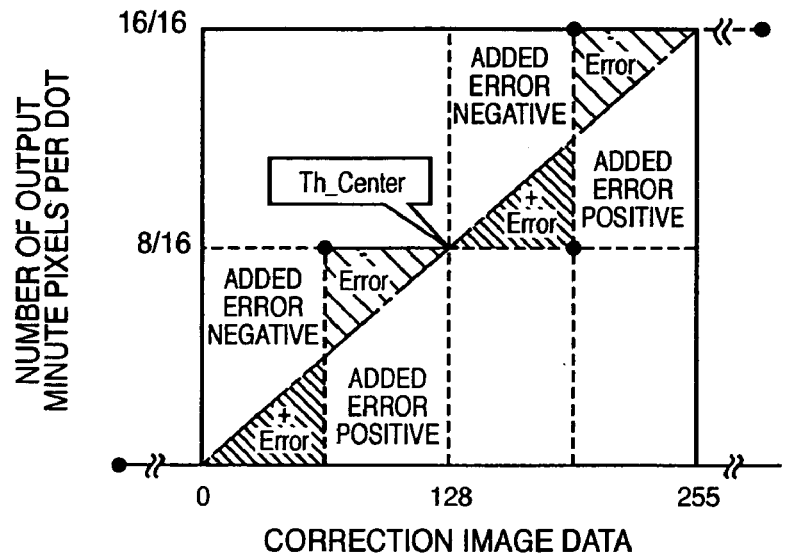
FIGS. 9A to 9D are drawings showing combinations (1) of added error code threshold values and fixed threshold values.
Figure 9B:
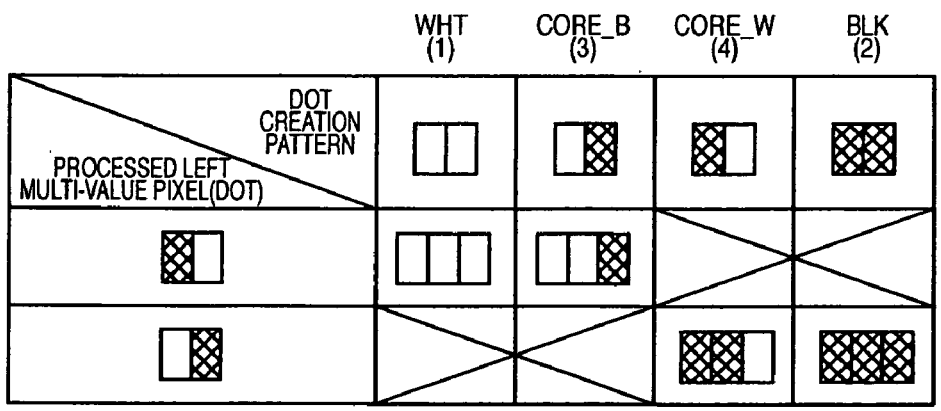
Figure 9C:
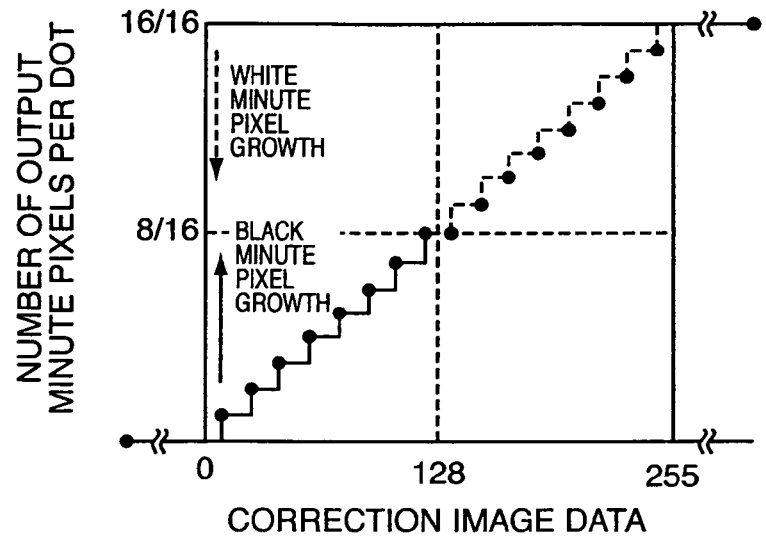
Figure 9D:
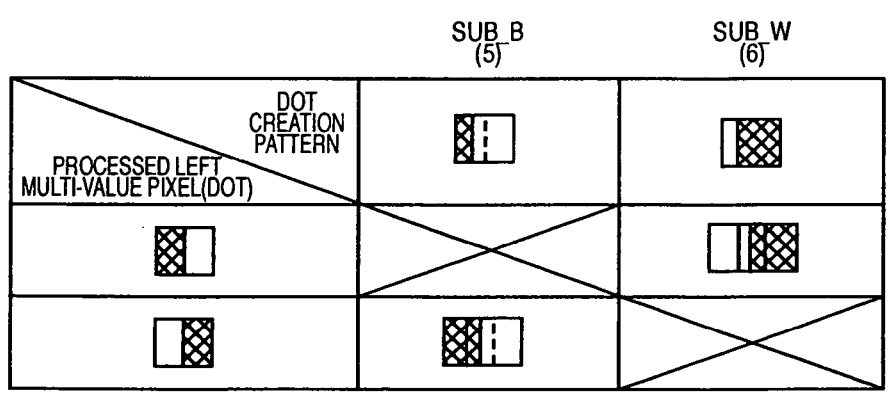
Figure 10A:
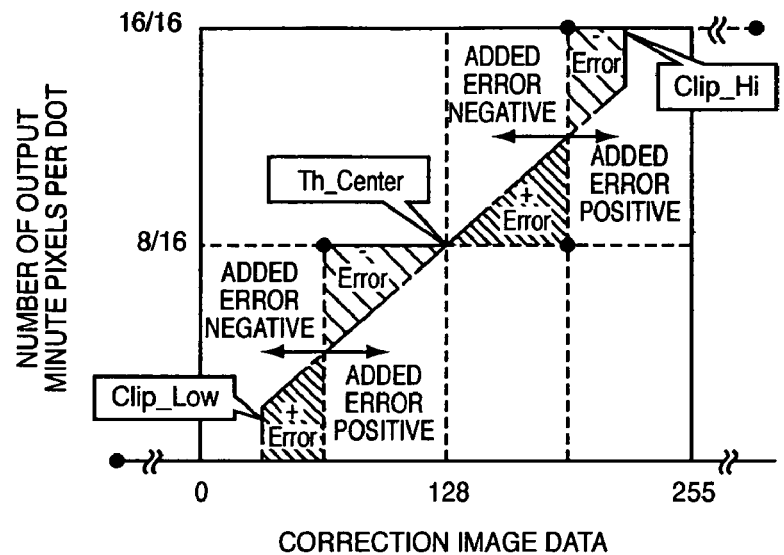
FIGS. 10A to 10D are drawings showing combinations (2) of added error code threshold values and fixed threshold values.
Figure 10B:
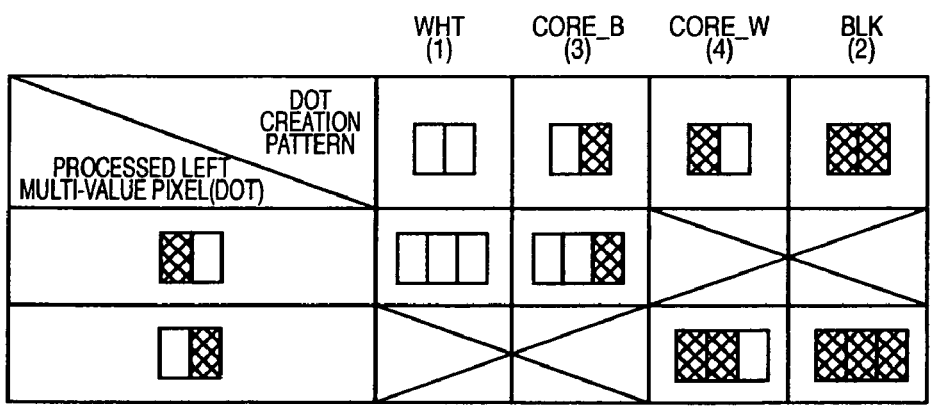
Figure 10C:
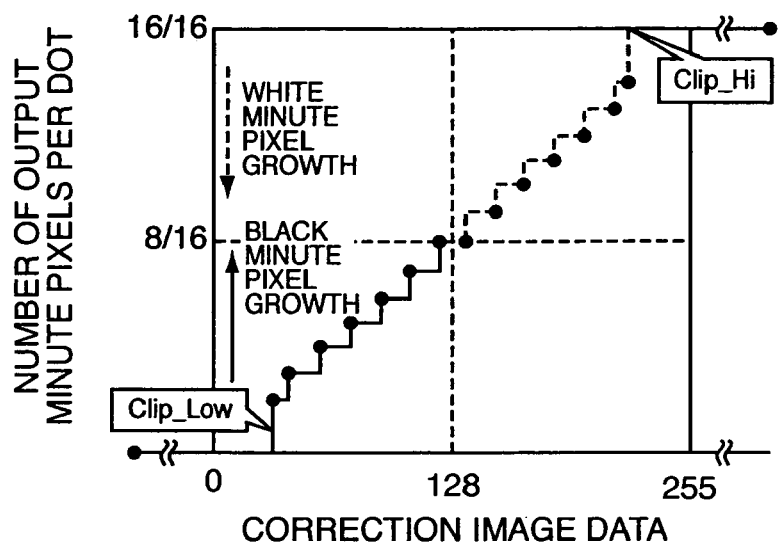
Figure 10D:
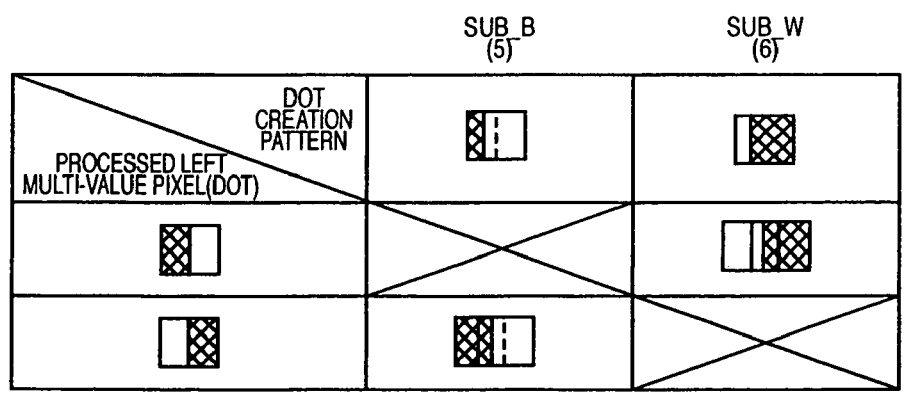
Figure 11A:
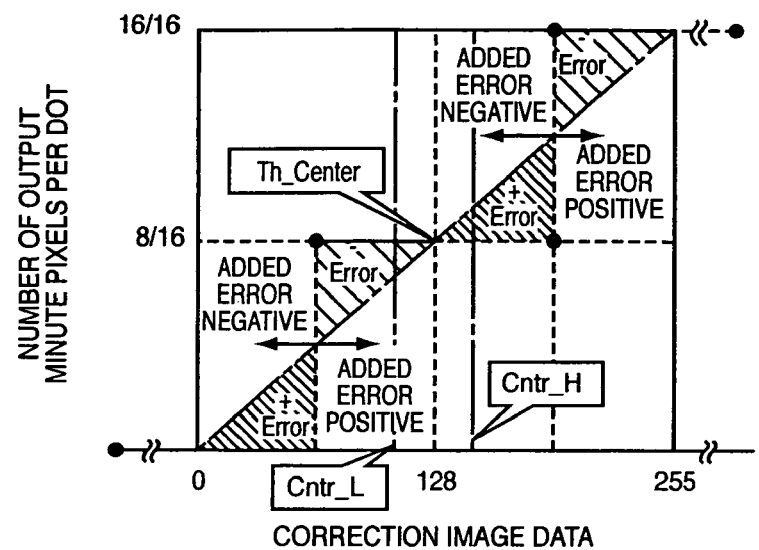
FIGS. 11A to 11D are drawings showing combinations (3) of added error code threshold values and fixed threshold values.
Figure 11B:
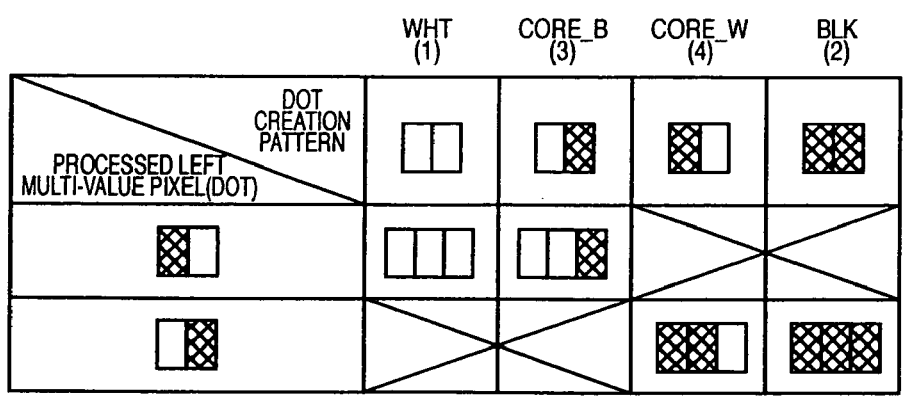
Figure 11C:
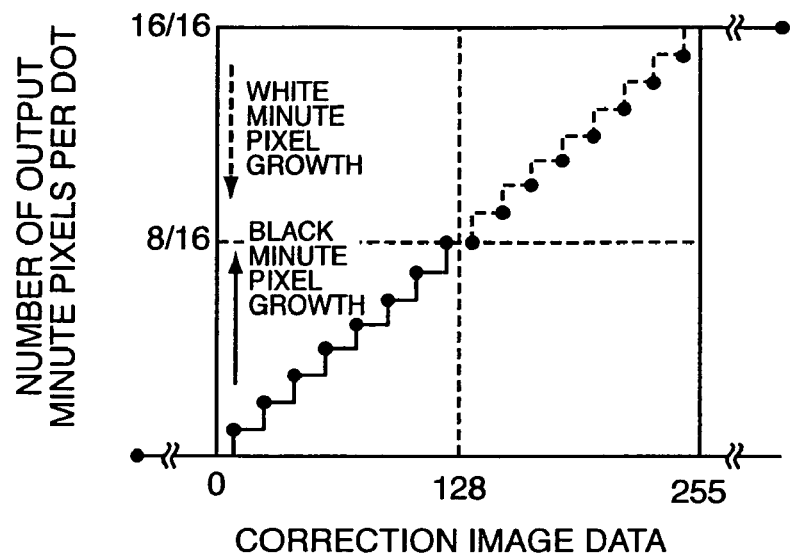
Figure 11D:
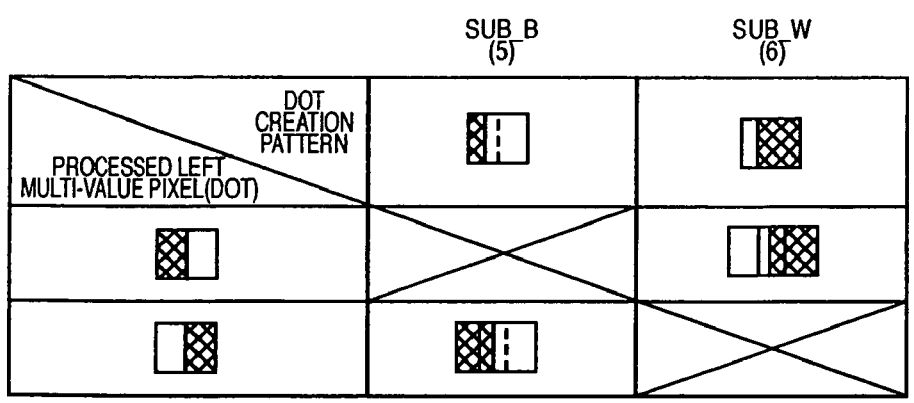

FIGS. 6A and 6B show an example of sub-dot conversion when Core_B exists in adjacent dots. In FIG. 6A, the upper left adjacent dot is Core_B, and since a relation of correction image data of the target pixel<Th_Center is satisfied, the target pixel is processed as SuB_B, so that minute pixels are turned on from the upper left corner in accordance with the value of the correction image data. In FIG. 6B, two adjacent dots, left and upper, are Core_B, so that minute pixels are turned in two locations, lower left and upper right, in SuB_B of the target pixel.

FIG. 7 shows a pattern of the occurrence of Core_W dots. Although ON and OFF are reversed with the case of Core_B, the processing procedure is the same. FIGS. 8A to 8F show only part of Core_W occurrence pattern examples.

As described above, according to the image processing method of the second embodiment, in addition to the image processing method of the first embodiment, to judge whether a multi-value target pixel is processed as a core dot or a sub-dot, binarized minute pixel patterns of processed multi-value pixels (dots) (left, upper, and upper left pixels in this example) adjacent to the target pixel are referenced to control minute pixel patterns to be formed. In this way, since the minute pixel patterns of the processed pixels can be reflected in a minute pixel pattern of the target pixel, elaborate minute pixel shapes can be designed.

In this embodiment, for core dot/sub-dot judgment, the multi-value image data of three processed multi-value pixels (left, upper, and upper left) adjacent to a target pixel is referenced. However, the present invention is not limited to this. The multi-value image data of at least one of four processed multi-value pixels (left, upper, upper right, and upper left) adjacent to a target pixel may be referenced.

In addition to the multi-value image data of processed multi-value pixels, to judge whether a target pixel is specified as a core dot or a sub-dot, the multi-value image data of at least one of four adjacent unprocessed multi-value pixels (right, lower, lower left, and lower right) may be referenced. That is, since unprocessed multi-value pixels also have multi-value image data, by use of a degree (high or low) of density at multi-value level as reference information, the reproducibility of image edges and adaptation to steep density inclination can be increased.

Third Embodiment

In the image processing method according to the first and second embodiments described previously, as threshold values of core dot judgment, the three threshold values, middle Th_Center, lower Th1_Low, and upper Th1_High, were used. Consequently, when Th_Center=128, Th1_Low=64, and Th1_High=192, if it is judged whether the most significant bit and second bit of correction image data of eight bits are 0 or 1, a core dot can be determined.

On the other hand, in an image processing method of this embodiment, instead of the lower threshold value Th1_Low and upper threshold value Th1_High, whether peripheral error values (hereinafter described as added error values) added to a multi-value target pixel are positive or negative is used as a second judgment criterion, which is used in combination with the first threshold value, middle Th_Center. The relationship between correction image data at this time and creation patterns is shown in FIGS. 9A to 9D.

When the right end of a processed left multi-value pixel (dot) is OFF (correction image data<Th_Center) & (added errors<0)→Wht (correction image data<Th_Center) & (0≦added errors)→Core_B Th_Center≦correction image data→Sub_W/left That is, in the case where the right end of a processed left multi-value pixel (dot) is OFF, when the correction image data is less than the middle threshold value Th_Center and added errors are negative, all minute pixels are turned OFF (pattern (1)), and when the correction image data is less than the middle threshold value Th_Center and added errors are positive (including 0), a core dot is turned ON (pattern (3)), that is, k number of minute pixels at proper locations, e.g., eight minute pixels of a right half portion are colored. When the correction image data is equal to or greater than the middle threshold value Th_Center, a leftmost sub-dot is turned OFF (pattern (6)), that is, the number of minute pixels in accordance with the density of the correction image data from the left end of a colored dot, including a minute pixel at a location adjacent to a left white dot are made uncolored. Conversely, minute pixels in accordance with the density of the correction image data from the right end are colored.

When the right end of a processed left multi-value pixel (dot) is ON correction image data<Th_Center→SuB_B/left (Th_Center≦correction image data) & (added errors<0)→Core_W (Th_Center≦correction image data) & (0≦added errors)→Blk In the case where the right end of a processed left multi-value pixel (dot) is ON, when the value of the correction image data is less than the middle threshold value Th_Center, a left sub-dot is turned ON (pattern (5)), that is, the number (less than k) of minute pixels in accordance with the density of the correction image data from the left end of uncolored dots, including a minute pixel at a location adjacent to a left black dot are colored. When the correction image data is equal to or greater than middle threshold value Th_Center and added error values are negative, a core dot is turned OFF (pattern (4)), that is, k number of minute pixels at a proper location of a colored dot, for example, eight minute pixels at the right half thereof are made uncolored. Conversely, minute pixels at the left half thereof are colored. When the correction image data is equal to or greater than the middle threshold value Th_Center and added error values are positive (including 0), all minute pixels are turned ON (pattern (2)).

As described above, in the image processing method of the third embodiment, the judgment of polarity (positive/ negative) of error values (correction data) added to judge a core dot is used as a second judgment criterion, which is used in combination with the first threshold value, which is the middle threshold value Th_Center. Therefore, in comparison with the image processing method according to the first and second embodiments, a core dot can be judged more quickly, so that core dots can be created faster in a state in which low-density multi-value pixels continue.

Fourth Embodiment

In the image processing method according to the third embodiment described previously, as threshold values of core dot judgment, judgment about whether peripheral added error values (correction data) added to a multi-value target pixel are positive or negative was used as a second judgment criterion, in combination with middle threshold value Th_Center, which is a first threshold value.

On the other hand, in the image processing method according to the present embodiment, as third judgment criterion, lower limit value Clip_Low and upper lower limit value Clip_High are added for use in combination with the second judgment criterion of making judgement about whether peripheral added error values (correction data) added to a multi-value target pixel are positive or negative, and middle threshold value Th_Center, which is a first threshold value. FIGS. 10A to 10D show a relationship between correction image data and creation patterns in this example.

When the right end of a processed left multi-value pixel (dot) is OFF Clip_Low>correction image data→Wht (Clip_Low≦correction image data<Th_Center & (added_ error<0)→Wht (Clip_Low≦correction image data<Th_Center & (0≦added error)→Core_B Th_Center≦correction data≦Clip_Hi→SuB_W/left correction image data>Clip_Hi→Blk That is, in the case where the right end of a processed left multi-value pixel (dot) is OFF, when the value of the correction image data is less than lower limit value Clip_Low, all minute pixels are turned OFF (pattern (1)), when the value of the correction image data is equal to or greater than lower limit value Clip_Low and is less than middle threshold value Th_Center, and an added error value is negative, all minute pixels are turned OFF (pattern (1)), and when the value of the correction image data is equal to or greater than lower limit value Clip_Low and is less than middle threshold value Th_Center, and an added error value is positive (including 0), a core dot is turned ON (pattern (3)), that is, k number of minute pixels at proper locations, e.g., eight minute pixels of a right half portion are colored. When the value of the correction image data exceeds the upper limit value Clip_Hi, all minute pixels are turned ON (pattern (2)). When the value of the correction image data is equal to or less than the upper limit value Clip_Hi and equal to or greater than the middle threshold value Th_Center, a leftmost sub-dot is turned OFF (pattern (6)), that is, the number of minute pixels in accordance with the density of the correction image data from the left end of a colored dot, including a minute pixel at a location adjacent to a left white dot are made uncolored. Conversely, minute pixels are colored according to the density of the correction image data from the right end.

When the right end of a processed left multi-value pixel (dot) is ON Clip_Low>correction image data→Wht Clip_Low≦correction image data<Th_Center→Sub_B/left (Th_Center≦correction data≦Clip_Hi) & (added error<0)→ Core_W (Th_Center≦correction data≦Clip_Hi) & (0≦added error)→Blk correction image data>Clip_Hi→Blk In the case where the right end of a processed left multi-value pixel (dot) is ON, when the value of the correction image data is less than the lower limit value Clip_Low, all minute pixels are turned OFF (pattern (1)). When the value of the correction image data is equal to or greater than the lower limit value Clip_Low and is less than the middle threshold value Th_Center, a left sub-dot is turned ON (pattern (5)), that is, the number of minute pixels in accordance with the density of the correction image data from the left end of an uncoloreddot, including a minute pixel at a location adjacent to a left black dot, are colored. When the value of the correction image data is equal to or greater than middle threshold value Th_Center and is equal to or less than upper limit value Clip_Hi, and the added error value is negative, a core dot is turned OFF (pattern (4)), that is, k number of minute pixels at a proper location of a colored dot, for example, eight minute pixels at the right half thereof are made uncolored. Conversely, minute pixels at the left half thereof are colored. When the value of the correction image data is equal to or greater than middle threshold value Th_Center and is equal to or less than upper limit value Clip_Hi, and the added error value is positive (including 0), all minute pixels are turned ON (pattern (2)). When the value of the correction image data exceeds the upper limit value Clip_Hi, all minute pixels are turned ON (pattern (2)).

As described above, in the image processing method according to the fourth embodiment, as a third judgment criterion, lower limit value Clip_Low and upper lower limit value Clip_High are added for use in combination with judgment of the polarity (positive/negative) of error values (correction data) added to judge a coredot, and middle threshold value Th_Center. By this arrangement, in comparison with the image processing method according to the third embodiment, image edges are made sharper, and images sent from input equipment 30 shown in FIG. 16 and input equipment (not shown) connected to client PC 20 can be prevented from background fog and density reduction.

Although, in the present embodiment, lower limit value Clip_Low or upper limit value Clip_Hi, and correction image data are compared, a comparison target may be multi-value image data or both correction image data and multi-value image data, in which case true/false of judgment may be decided when both or one of them satisfies conditions. Only any one case may be adopted depending on a system or input images, or switching may be made among different uses by a flag or the like.

As the values of lower limit value Clip_Low and upper limit value Clip_Hi used as the third judgement criterion, the lower limit value Clip_Low is preferably equal to or less than the middle threshold value Th_Center, and the upper limit value Clip_Hi is preferably equal to or greater than the middle threshold value Th_Center. However, the lower limit value Clip_Low and upper limit value Clip_Hi may assume any values unless the lower limit value Clip_Low exceeds the upper limit value Clip_Hi; the values of them may be changed to suit the characteristics of the image forming system and input images.

In the present embodiment, comparison between lower limit value Clip_Low or upper limit value Clip_Hi and correction image data is made after judgement of a processed left multi-value pixel. However, the comparison between lower limit value Clip_Low or upper limit value Clip_Hi and correction image data may be made before judgement of a processed left multi-value pixel.

Fifth Embodiment

In the image processing method according to the third embodiment described previously, as threshold values of core dot judgment, judgment about whether peripheral added error values (correction data) added to a multi-value target pixel are positive or negative was used as a second judgment criterion, in combination with middle threshold value Th_Center, which is a first threshold value.

On the other hand, in the image processing method according to the present embodiment, as a third judgment criterion, central lower limit value Cntr_L and central upper limit value Cntr_H which define a middle range in the vicinity of middle threshold value Th_Center inclusive, and a flag Flag (e.g., 1 or 0) indicating whether minute pixel formation processing in the middle range is valid or invalid are added for use in combination with the second judgment criterion of making judgement about whether peripheral added error values (correction data) added to a multi-value target pixel are positive or negative, and middle threshold value Th_Center, which is a first threshold value.

For the flag Flag indicating whether minute pixel formation processing in a middle range is valid or invalid, in this example, two different flags are used for different uses. That is, the middle range is divided into the central lower limit value Cntr_L side and the upper central limit value Cntr_H side with middle threshold value Th_Center as a center so that a lower side flag Flag_L and an upper side flag Flag_H are respectively used to indicate whether minute pixel formation processing in a corresponding range is valid or invalid. FIGS. 11A to 11D show a relationship between correction image data and creation patterns in this example.

When the right end of a processed left multi-value pixel (dot) is OFF (correction image data<Cntr_L) & (added errors<0)→Wht (Cntr_L≦correction image data<Th_Center) & (added errors<0)→Flag_L dependent (Flag_L=0→Wht, Flag_L=1→Core_B) (correction image data<Th_Center) & (0≦added error)→Core_B Th_Center≦correction image data→Sub_W/left That is, in the case where the right end of a processed left pixel is OFF, when the value of the correction image data is less than the central lower limit value Cntr_L and the value of added errors is negative, all minute pixels are turned OFF (pattern (1)). When the value of the correction image data is equal to or greater than the central lower limit value Cntr_L and less than the middle threshold value Th_Center and the value of added errors is negative, all minute pixels are turned OFF according to the lower side flag Flag_L (pattern (1)), or a core dot is turned ON (pattern (3)). When the value of the correction image data is less than the middle threshold value Th_Center and the value of added errors is positive (including 0), a core dot is turned ON (pattern (3)), that is, k number of minute pixels at proper locations, e.g., eight minute pixels of a right half portion are colored. When the value of the correction image data is equal to or greater than the middle threshold value Th_Center, a leftmost sub-dot is turned OFF (pattern (6)), that is, the number of minute pixels in accordance with the density of the correction image data from the left end of a colored dot, including a minute pixel at a location adjacent to a left white dot are made uncolored. Conversely, minute pixels are colored in accordance with the density of the correction image data from the right end.

When the right end of a processed left multi-value pixel (dot) is ON correction image data<Th_Center→SuB_B/left (Th_Center≦correction image data) & (added errors<0)→Core_W (Th_Center≦correction image data≦Cntr_H) & (0≦added errors)→Flag_H dependent (Flag_H=0→Blk, Flag_H=1→Core_W) (Cntr_H<correction image data) & (0≦added errors)→Blk In the case where the right end of a processed left multi-value pixel (dot) is ON, when the correction image data is less than middle threshold value Th_Center, a left sub-dot is turned ON (pattern (5)), that is, the number of minute pixels in accordance with the density of the correction image data from the left end of an uncolored dot, including a minute pixel at a location adjacent to a left black dot are colored. When the value of the correction image data is equal to or greater than middle threshold value Th_Center and the value of added errors is negative, a core dot is turned OFF (pattern (4)), that is, k number of minute pixels at a proper location of a coloreddot, for example, eight minute pixels at the right half thereof are made uncolored. Conversely, minute pixels at the left half thereof are colored. When the value of the correction image data is equal to or greater than the middle threshold value Th_Center and equal to or less than the central upper limit value Cntr_H and the value of added values is positive (including 0), all minute pixels are turned ON according to the upper side flag Flag_H (pattern (2)) or a core dot is turned OFF (pattern (4)). When the value of the correction image data exceeds the central upper limit value Cntr_H and the value of added errors is positive (including 0), all minute pixels are turned ON (pattern (2)).

As described above, in the image processing method according to the fifth embodiment, as a third judgment criterion, central lower limit value Cntr_L and central upper limit value Cntr_H which define a middle range, lower side flag Flag_L and upper side flag Flag_H indicating whether minute pixel formation processing in the middle range is valid or invalid are added for use in combination with judgment of the polarity (positive/negative) of error values (correction data) added to judge a coredot, and middle threshold value Th_Center. By this arrangement, in comparison with the image processing method according to the third embodiment, since the concentration of ON minute pixels in middle density areas can be controlled, a sense of incongruity caused by a concentration change of ON minute pixels in density areas can be prevented.

Although, in the present embodiment, central limit value Cntr_L and central upper limit value Cntr_H, and correction image data are compared, a comparison target may be multi-value image data or both correction image data and multi-value image data, in which case true/false of judgment may be decided when both or one of them satisfies conditions. Only any one case may be adopted depending on a system or input images, or switching may be made among different uses by a flag or the like.

The values of central lower limit value Cntr_L and central upper limit value Cntr_H should satisfy the relation of 0≦central lower limit value Cntr_L≦middle threshold value Th_Center and the relation of middle threshold value Th_Center≦central upper limit value Cntr_H≦255 (maximum value of density). The values of them may be appropriately decided to suit the characteristics of the image forming system and input images.

The lower side flag Flag_L and the upper side flag Flag_H may occur as 1 or 0 at a predetermined ratio to suit the characteristics of the image forming system. Specifically, depending on the lower side flag Flag_L and the upper side flag Flag_H, it can be changed at a predetermined ratio that minute pixels are formed when the value of at least one of multi-value image data and correction image data falls within a predetermined range (middle range). The lower side flag Flag_L and the upper side flag Flag_H may be an identical flag.

Sixth Embodiment

Figure 12A:
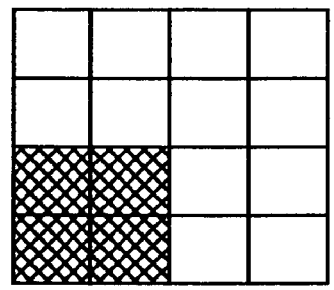
FIGS. 12A to 12C are drawings showing a core dot pattern for each density.
Figure 12B:
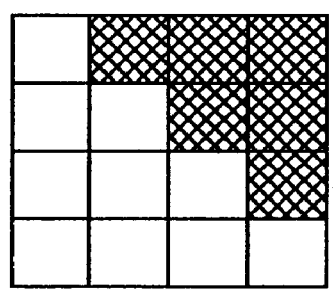
Figure 12C:
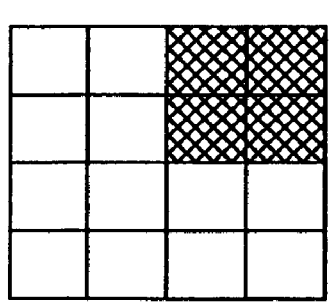

In an image processing method according to this embodiment, an image corresponding to multi-value image data or correction image data is split into plural areas, and depending on the split areas, the number of minute pixels to be created as a core dot, that is, the size of a core dot pattern is changed. As shown in FIGS. 12A to 12C, by changing the size of a core dot pattern for each density, the size of a reproduction start dot can be set in accordance with the gradation characteristics of output equipment.

In the image processing method according to this embodiment, the error diffusion processing is characterized in that a density is kept by the number of minute pixels turned ON. Therefore, if the size of a core dot is changed to increase the size of one cluster dot (a collection of minute pixels), the number of cluster dots is reduced and the spatial frequency of a binarized image decreases.

Generally, in error diffusion processing, it tends to become difficult for output equipment to respond because of too high a spatial frequency in middle-density areas. In the image processing method according to this embodiment, however, by changing the size of a core dot minute pixel pattern for each density, spatial frequency characteristics in middle-density areas can be adjusted. When the size of a core dot pattern is set, the number of minute pixels to be created as a core dot is randomly changed for each of processing minute-value pixels. In this way, the dispersibility of cluster dots increases and texture noise for specific image data can be prevented, greatly contributing to an improvement in quality.

Figure 13:
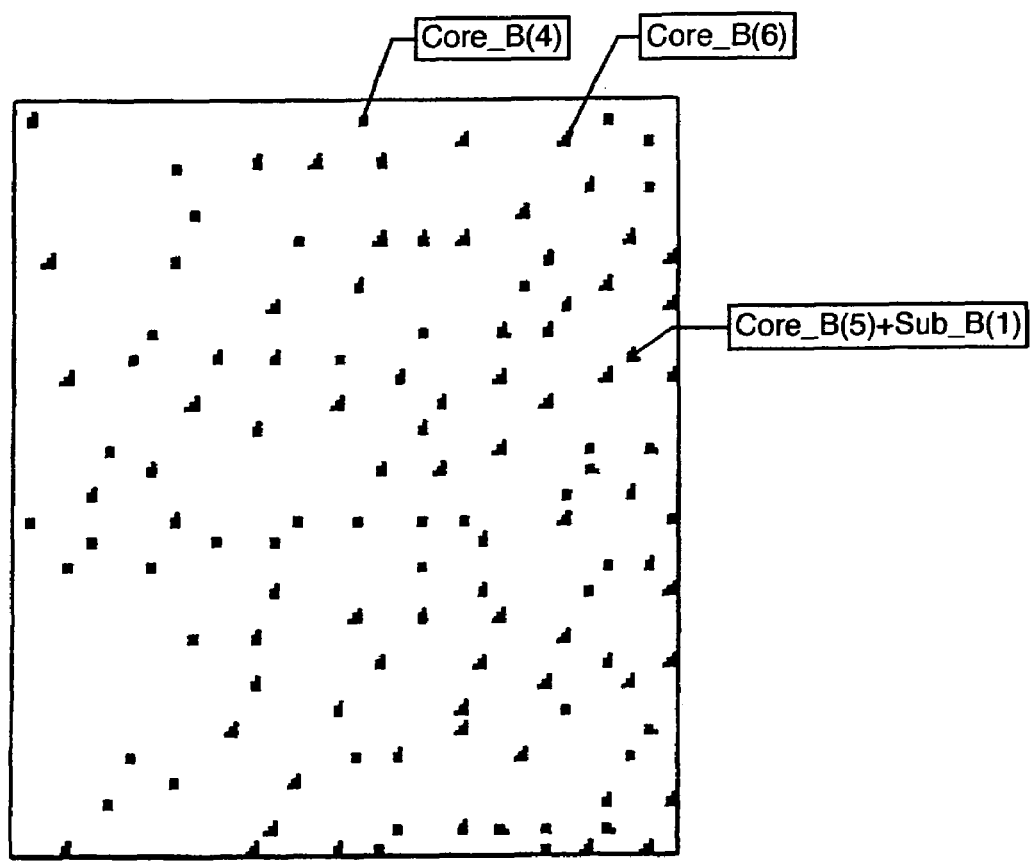
FIG. 13 is a drawing showing a processing image (low-density part)

FIG. 13 shows an example of dot patterns in a low-density area. In this pattern example, since the size of core dots (Core_B) in a low-density area are about 4 to 6 minute pixels, Core_B dots with four or six minute pixels are dispersed and SuB_B is adjacent to some of the Core_Bdots.

Figure 14A:
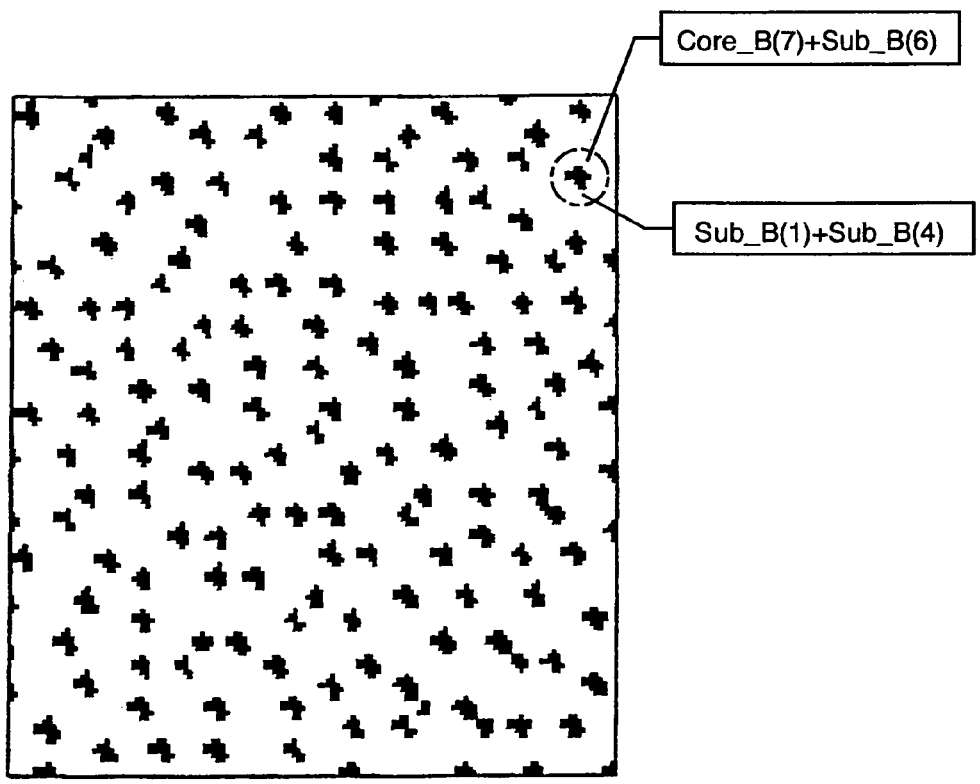
FIGS. 14A and 14B are drawings showing a processing image (middle-density part)
Figure 14B:
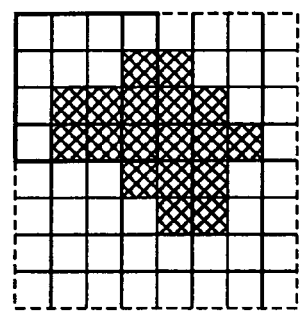

FIGS. 14A and 14B show an example of dot patterns in a middle-density area. In this pattern example, since the size of core dots (Core_B) in a middle-density area are about 6 to 8 minute pixels, Core_B dots with six or eight minute pixels are dispersed and SuB_B is adjacent to most of the Core_Bdots. In the drawing, in the enlarged dot pattern, Core_B dot with seven minute pixels neighbors a right SuB_B dot with six minute pixels and a lower SuB_B dot with one minute pixel.

Figure 15:
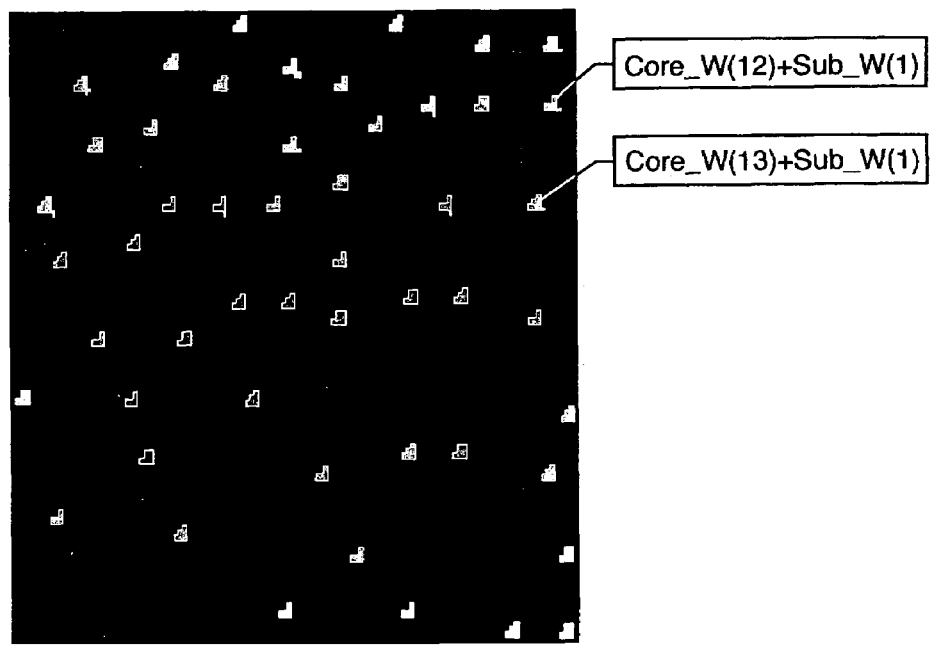
FIG. 15 is a drawing showing a processing image (high-density part)

FIG. 15 shows an example of a dot pattern in a high-density area. As apparent from the drawing, Core_W occurs in a high-density area. In this pattern example, Core_W dots with 12 to 14 white-on-black minute pixels are dispersed and no more than one SuB_W is attached to some of them.

In order that cluster dots with minute pixels as shown in this embodiment are two-dimensionally dispersed to represent gradation as shown in this embodiment, the dispersibility of cluster dots is important and therefore various parameters are switched on a processing line basis as performed in common error diffusion processing. Parameters to be switched to includes, e.g., error filter factor, threshold values, amplitude of random number and the like.

In the image processing method according to this embodiment, in addition to these common methods, intrinsic parameters such as core dot size and core dot judgment threshold values are made to be different for even lines and odd lines. Thus changing processing parameters for odd lines and even lines of multi-value image data contributes to an improvement in image quality because texture noise for specific image data can be prevented.

Although, in the image processing methods according to the embodiments described above, density or combination of density and the polarity judgment of an added error value is used as threshold values for judging a basic core dot, values produced by calculating the values of multi-value image data for not only density itself but also density threshold values at a predetermined ratio may be used as threshold values for judging a basic core dot. Polarity judgment of an added error value may be added with the magnitude of errors.

Next, a description is made of an image processing apparatus that executes the image processing method according to this embodiment. The image processing apparatus is used as a recording signal processing part for processing a recording signal (image signal) supplied to an image output apparatus, e.g., a laser printer. This application example is only one example, and the present invention is not limited to this application example.

Figure 16:
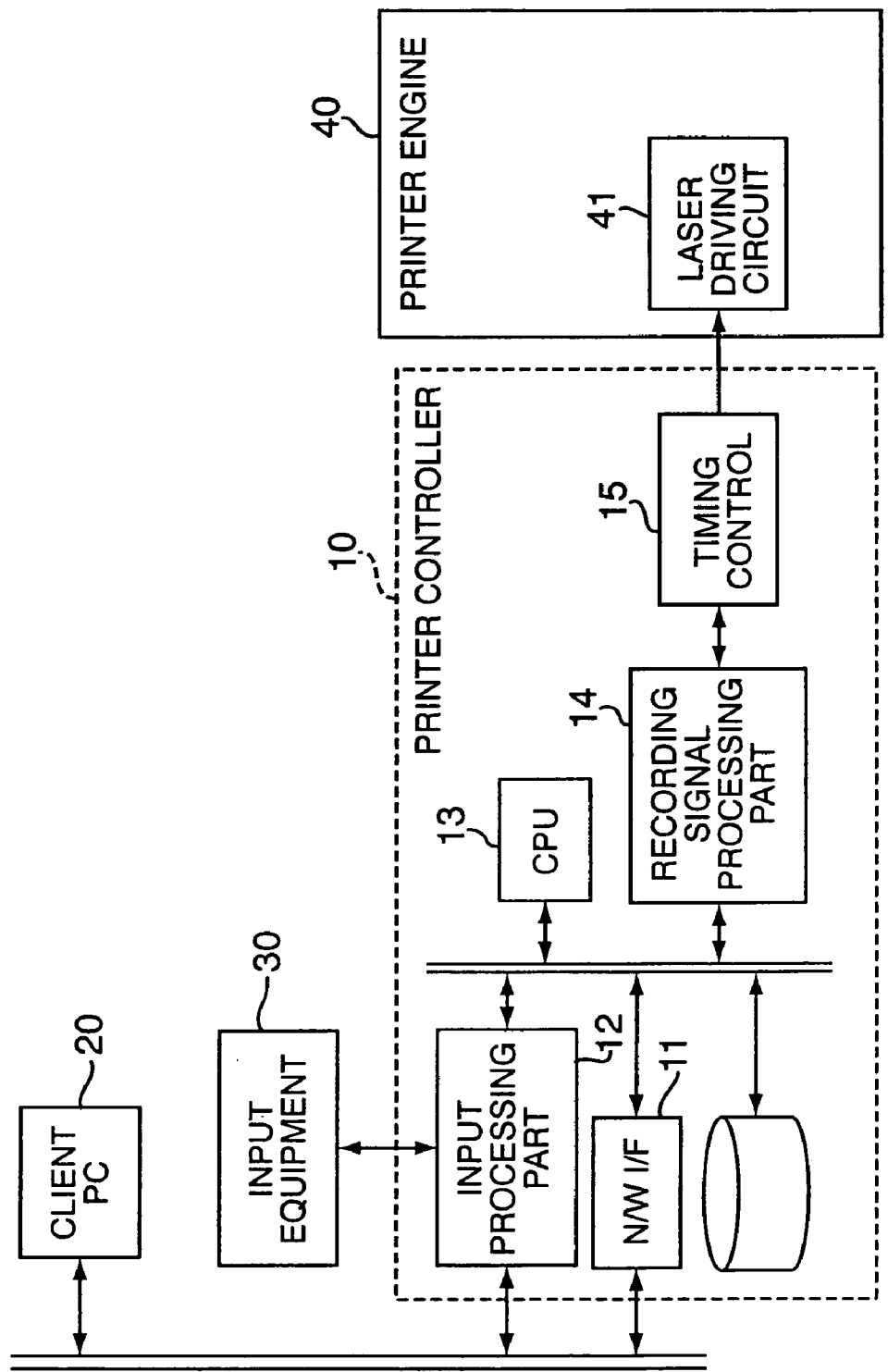
FIG. 16 is a block diagram showing an outline of a laser printer configured along a flow of an image signal.

FIG. 16 is a block diagram showing an outline of a laser printer configured along a flow of an image signal. The laser printer in this example includes circuit equipment called a printer controller 10. The printer controller 10 is supplied with image data from a client PC 20 and the like through a network interface (N/WI/F) 11, and read image data from input equipment 30 such as a scanner through an input processing part 12.

These image data and signals are subjected to color conversion, resolution conversion, and various image processing such as enlargement and reduction by a CPU 13 and dedicated hardware of the printer controller 10, and are converted into image data of color components suitable for a recording device. The image data after the color conversion is processed by a recording signal processing part 14 upon activation of the recording device, and sent to a laser driving circuit 41 of the recording device, e.g., a printer engine 40 while its output timing is controlled by a timing control part 15.

In the printer controller 10, an image processing device for executing the image processing methods according to the above-described embodiments is used as the recording signal processing part 14 that converts color-resolved multi-value image data into binary data such as laser on/off signals. In other words, the recording signal processing part 14, by executing the image processing methods according to the above-described embodiments, performs signal processing for putting color-resolved multi-value image data into gradation representation by binary data of plural minute pixels while performing error diffusion processing.

Image Processing Apparatus

Figure 17:
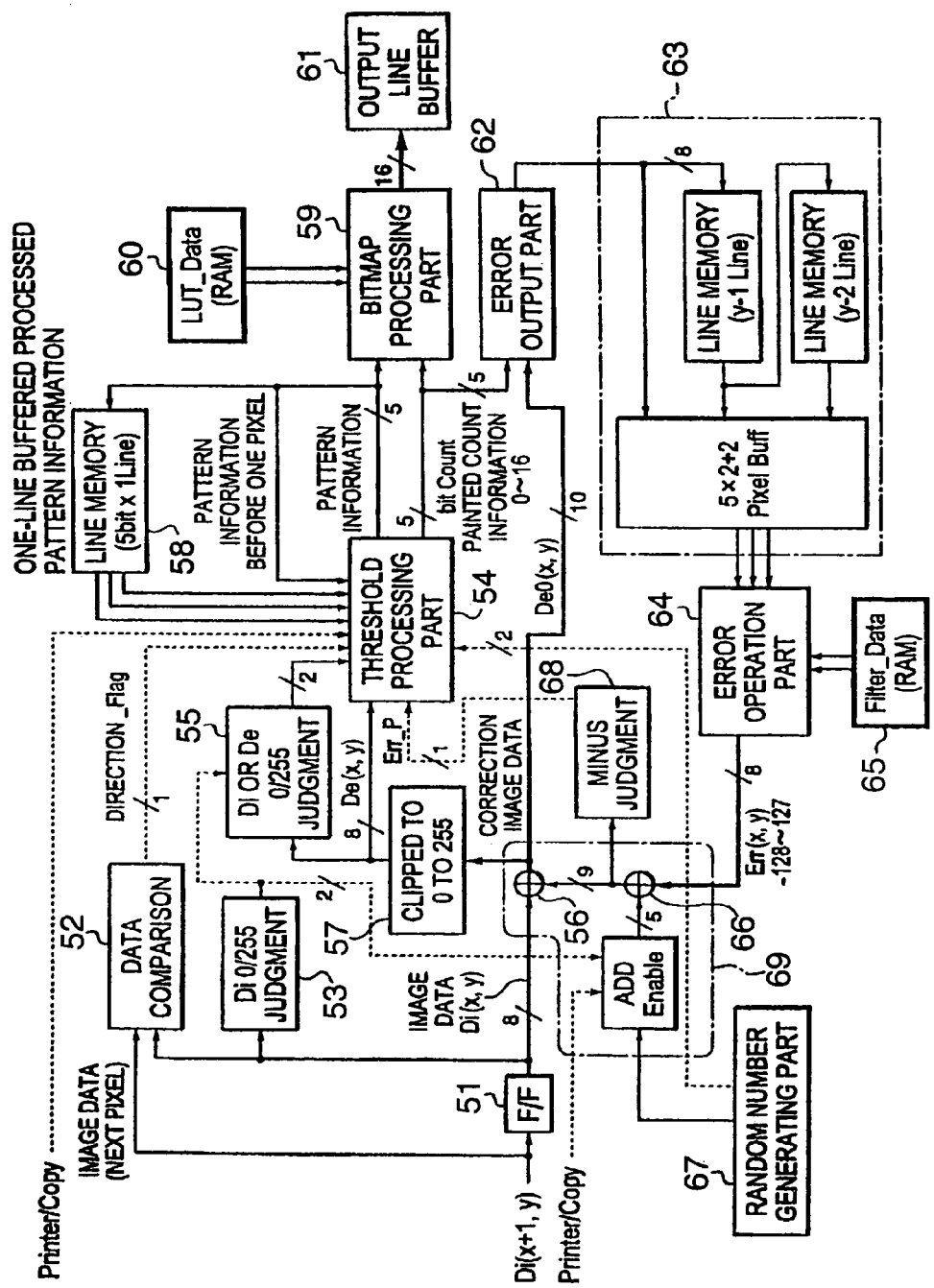
FIG. 17 is a block diagram showing the configuration of an image processing apparatus according to the present invention.

FIG. 17 shows the configuration of an image processing apparatus according to the present invention, used as the recording signal processing part 14 of a laser printer. In FIG. 17, multi-value image data is inputted as an input signal Di. Di(x,y) denotes the image data of a multi-value target pixel and Di(x+1,y) denotes the image data of a multi-value pixel next to a target pixel. The image data Di(x,y) of a target pixel is made up of, e.g., flip-flops (F/F), and is captured into a data latch part 51 operating on pixel clock.

The image data Di(x,y) is supplied to a data comparing part 52 and a 0/255 judging part 53. The data comparing part 52 compares the image data Di(x,y) of a target pixel with the image data Di(x+1,y) of the next multi-value pixel. A comparison result of the data comparing part 52 is passed to a threshold processing part 54 as an information_Flag indicating a direction in the multi-value image data. The 0/255 judging part 53 judges whether the image data Di(x,y) of the multi-value target pixel is 0, 255, or others, and passes a judgment result to a 0/255 judging part 55.

The image data Di(x,y) of the target pixel is further supplied to an adder 56. The adder 56 adds correction data described later to the image data Di(x,y) to create correction image data De0(x,y). The correction image data De0(x,y) is clipped into eight bits (0 to 255) in a clipping part 57 and supplied to the threshold processing part 54 and the 0/255 judging part 55. The 0/255 judging part 55 judges whether the image data Di(x,y) or correction image data De0(x,y) is 0, 255, or others, and passes a judgment result to the threshold processing part 54.

The threshold processing part 54, without directly creating bitmap data of minute pixels, outputs pattern information (code information) indicating in what pattern one dot is formed by minute pixels, and count information about the number of minute pixels turned ON within one dot (painted count information). The pattern information contains information indicating whether the minute pixel pattern is a core dot or a sub-dot, a pattern direction, all minute pixels ON, and all minute pixels OFF. An internal configuration of the threshold processing part 54 will be described later.

Pattern information and painted count information outputted from the threshold processing part 54 are passed to a bitmap processing part 59. The bitmap processing part 59 creates bitmap data using data LUT_Data of a lookup table (LUT) stored in RAM 60, based on the code information and count information. The created bitmap data is stored in an output line buffer 61.

The painted count information outputted from the threshold processing part 54 is also supplied to an error output part 62 along with correction image data De0(x,y). The error output part 62 calculates a density error value from the painted count information and correction image data De0(x,y) supplied from the threshold processing part 54. The calculated density error value is passed to an error buffer part 63. The error buffer part 63 successively stores density error values of one or two lines in a line memory to collect error data required to process a next multi-value pixel, and passes the collected error data to an error operation part 64.

The error operation part 64 multiplies the error data received from the error buffer part 63 by filter factors stored in advance in RAM 65 and sends the result Err(x,y) of the product-sum operation to an adder 66. The adder 66 adds random number data created in a random number generating part 67 to the product-sum operation result Err(x,y) in the error operation part 64, and the added data is supplied to the adder 56 as correction data described previously.

The random number data is enabled or disabled depending on the usage and operation mode of recording equipment. Part of an output of the random number generating part 67 is supplied to the threshold processing part 54. The added data of the adder 66 or correction data is also supplied to a minus judger 68. The minus judger 68 judges the polarity of the correction data and sends polarity information Err_P judged as negative to the threshold processing part 54.

Figure 18:
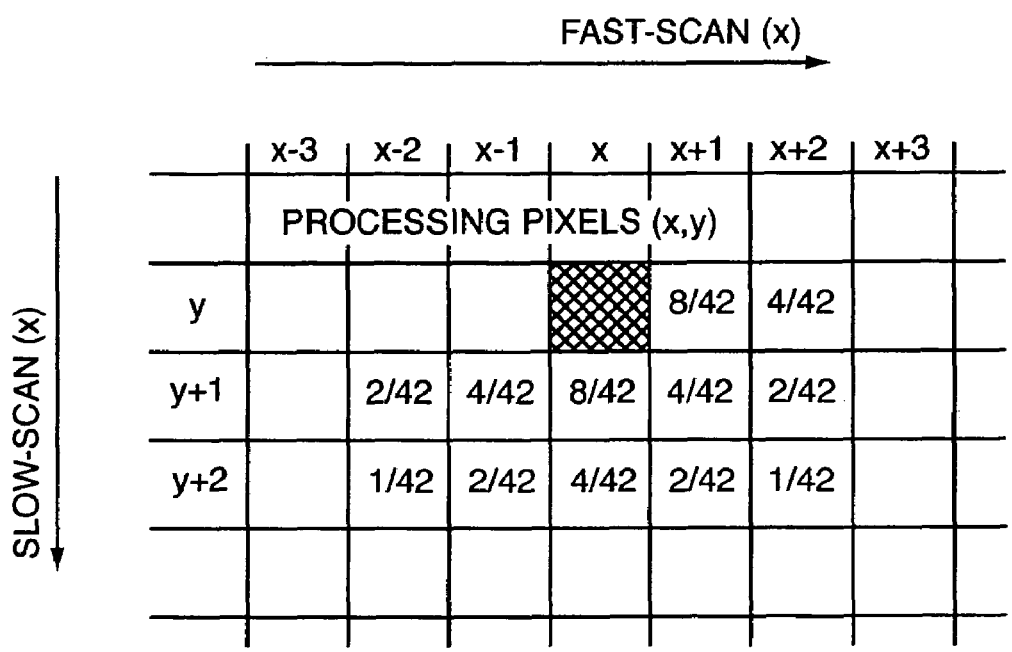
FIG. 18 is a drawing showing an example of diffusion error factors.

FIG. 18 shows an example of an error diffusion filter used for error operations in the error operation part 64. Configuration requirements of the present invention do not dictate the characteristics of the error filter. The configuration of line memories of the error buffer part 63 may be changed according to the design of the error filter, not necessarily requiring two stages.

Filter factors used in the error operation part 64 and LUT_Data used in the bitmap processing part 59 may be recorded in recording elements such as a ROM or used in the form of data written to a RAM from external equipment. The bitmap processing part 59 can easily rewrite a lookup table for referring to pattern information and count information if it is formed on RAM, and can perform switching according to different modes.

Figure 19:
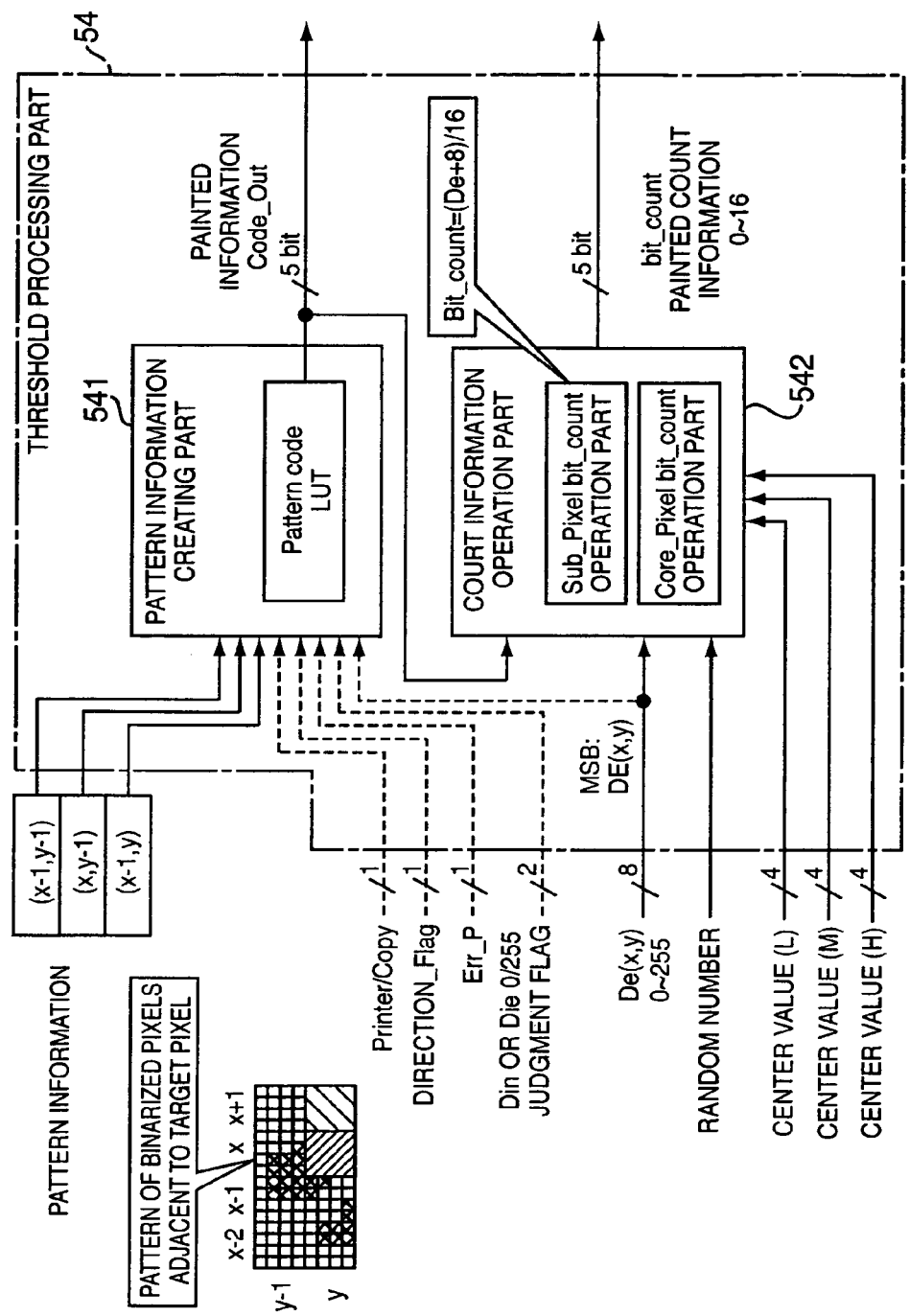
FIG. 19 is a block diagram showing a configuration of a threshold processing part.
Figure 20:
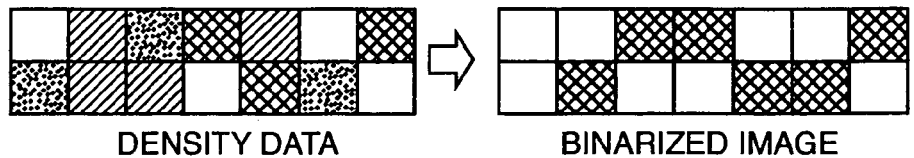
FIG. 20 is a drawing for explaining binary error diffusion.
Figure 21:
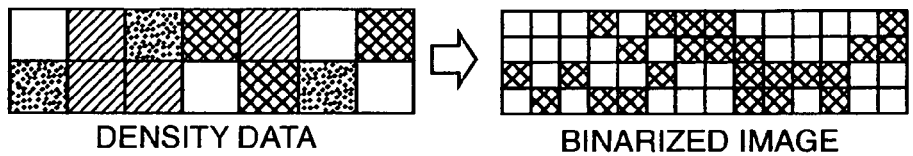
FIG. 21 is a drawing for explaining binary error diffusion (high resolution type)
Figure 22:
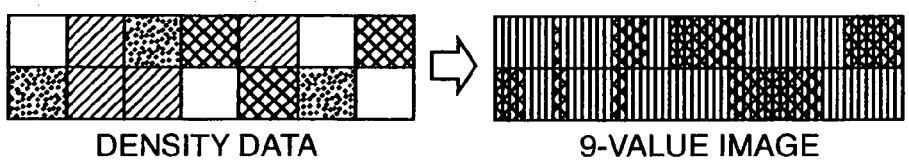
FIG. 22 is a drawing for explaining multi-value error diffusion.

FIG. 19 is a block diagram showing a configuration of the threshold processing part 54. The threshold processing part 54 of this example makes up a pattern information creating part 541 and a count information creating part 542.

The pattern information creating part 541 creates pattern information, using processed multi-value pixel pattern information of plural multi-value pixels, direction information_ Flag, polarity information Err_P, 0/255 judgment flag, Printer/Copy information, the most significant bit of correction image data De(x,y), and other input information. The pattern information is outputted to the outside (the bitmap processing part 59 in FIG. 17) without modification and supplied to the count information creating part 542.

The pattern information creating part 541 can be easily implemented if it is configured with a lookup table using a RAM. The pattern information creating part 541 does not always use all shown signals. Since a larger number of input bits makes the lookup table larger in size, the signals should be appropriately selected as required.

The count information creating part 542 determines a core dot or a sub-dot from the pattern information supplied from the pattern information creating part 541, and creates count information (painted count information) indicating the number of ON minute pixels from correction image data De(x,y) and random number data. The count information creating part 542 performs different processing for core dots and sub-dots.

For sub-dots, the number of bits corresponding to a density is calculated. As shown in the example of the drawing, for a 4-by-4 minute pixel configuration, a density area is multi-value-quantized to 16 steps (17 levels). For core dots, as many ON bits as subjected to random number processing are outputted to center values (L, M, H) corresponding to density areas.

With the above-described circuit configuration, an image processing apparatus executing the image processing methods according to the embodiments described previously is implemented. The circuit operation of the image processing apparatus is described.

The error operation part 64 multiplies density error information received via the error buffer part 63 from the error output part 62 by a weighting factor (filter factor in this example) corresponding to a relative position to produce correction data of a next multi-value target pixel. The correction data is added with random number data in the adder 66 and then added to image data Di(x,y) of a multi-value target pixel in the adder 56. That is, the two adders 56 and 66 constitute a correction data processing part 69 that adds the correction data to the image data Di(x,y) of the target pixel.

The threshold processing part 54, line memory 58, bitmap processing part 59, and peripheral circuits thereof, if the image data Di(x,y) of the target pixel is equal to or greater than a predetermined density, form a dot having k (k is 2 or greater integer) number of minute pixels or more in correspondence with the target pixel; if the multi-value image data of the target pixel is less than the predetermined density, only in the case where a dot is to be formed for an adjacent multi-value pixel concerned, forms a dot having as many minute pixels as the density of the target pixel so as to be properly arranged with respect to the adjacent multi-value pixel.

Specifically, the threshold processing part 54, without directly creating bitmap data of minute pixels, outputs pattern information indicating in what pattern one dot is formed by minute pixels, and count information about the number of minute pixels turned ON within onedot. For example, ON/OFF patterns of an n by m minute pixel matrix are defined by the six dot patterns (1) to (6) described previously, and a multi-value target pixel is decided as one of the six dot patterns from the relationship between the value of correction image data De(x,y) produced by adding correction data such as errors from peripheral binarized dots to the multi-value image data of the target pixel and an ON/OFF pattern of a leftdot.

The error output part 62 compares a density (painted count information outputted from the threshold processing part 54 in this example) represented by colored minute pixels within one dot and the correction image data De(x,y) to calculate a density error and outputs it as density error information. The density error information is successively temporarily stored in the error buffer part 63. That is, a loop of the correction data processing part 69, threshold processing part 54, error output part 62, error buffer part 63, error operation part 64, and correction data processing part 69 forms an error diffusion processing routine.

A series of operations described above are summarized as follows. When input image data represented by multi-values is put into gradation representation by binary data of plural minute pixels while being subjected to error diffusion processing, if correction image data produced by adding correction data to the multi-value image data of a target pixel is equal to or greater than a predetermined density, a dot having k number of minute pixels or more is formed in correspondence with the multi-value target pixel; if the correction image data is less than the predetermined density, only in the case where a dot is to be formed for a proper adjacent multi-value pixel so as to be adjacent to the adjacent multi-value pixel, a dot having the number of minute pixels in accordance with the density of the correction image data of the multi-value target pixel is formed, an error between the density of the formed dot and the density of the correction image data is calculated, and the density error information is multiplied by a weighting factor so that the result of the multiplication is used as correction data of a next multi-value target pixel. The above processing is sequentially performed for each of processing pixels while updating the addresses of processing multi-value pixels.

Although this application example describes the present invention applied to a laser printer, the present invention can also be used for creation of recording signals of ink jet printers, as well as plate making apparatuses and film recording apparatuses, and for these apparatuses.

As has been described above, according to the present invention, while core dots to serve as base points for starting dot reproduction are controlled to be equal to or greater than a predetermined size, binarization processing is performed by the error diffusion method (multi-value error diffusion) to make sub-dots adjacent to the core dots, which are base points. As a result, since the sub-dots accompanying the core dots are dispersed throughout while being arranged somewhat irregularly, satisfactory gradation reproduction can be achieved. Particularly, if dots larger than one multi-value pixel are arranged by dot size modulation, since the dot density becomes lower than if dots of one multi-value pixel size are arranged in the same area, it can be prevented that dots becomes highly dense, and the occurrence of washout and blocks can be prevented. Also, since error diffusion processing is performed during creation of core dots and sub-dots, density preservability can also be assured. Moreover, by changing the size of core dot as a parameter, binarized images of a dot size structure suitable for the characteristics of output equipment can be easily created.

The above-described effects enable use of error diffusion processing having been difficult to use in marking technology utilizing processes that are excellent in adaptation to dot area modulation but are strict with reproducibility of images interspersed with minute dots, such as electronic photo process and printing, greatly contributing to high-quality image reproduction.

What is claimed is:

1. An image processing method that puts input image data represented by multi-value pixels into gradation representation of dots having binary data of plural minute pixels while performing error diffusion processing, comprising:
    a first step that, when a dot is formed which corresponds to correction image data produced by adding correction data to multi-value image data of a multi-value target pixel, only in the case where the dot is to be formed so as to be adjacent to a dot formed for a proper adjacent multi-value pixel, forms the dot even if it has less than k (2 or greater integer) number of minute pixels, and in other cases, forms only a dot having k number of minute pixels or more; and
    a second step that calculates an error between a density of the correction image data and a density of the dot formed in the first step and uses the density error information as the correction data of peripheral multi-value pixels,
    wherein processing in the steps is sequentially performed for each of processing multi-value pixels.

2. The image processing method according to claim 1, wherein the first step colors all minute pixels of the n-by-in minute pixel matrix colored when a value of at least one of the multi-value image data and the correction image data is greater than a second judgment value.

3. The image processing method according to claim 1, wherein:
    the multi-value image data is gradation-represented by binary data of n by m (n×m)>1, n and m are integers, respectively) number of minute pixels perdot; and
    in processing of the first step, pixel data in the vicinity of the target pixel and the correction image data are referred to, and an n-by-in minute pixel matrix is divided into at least six patterns to form a dot as follows:
    (1) all minute pixels are made uncolored;
    (2) all minute pixels are colored;
    (3) of n by m minute pixels, K number or greater minute pixels at proper locations are colored;
    (4) of n by m minute pixels, K number or greater minute pixels at proper locations are uncolored;
    (5) of n by m minute pixels, a number of minute pixels in accordance with the density of the correction image data, including a minute pixel at a location adjacent to the pattern (3), are colored; and
    (6) of n by m minute pixels, a number of minute pixels in accordance with the density of the correction image data, including a minute pixel at a location adjacent to the pattern (4), are made uncolored.

4. The image processing method according to claim 3, wherein the first step refers to a binarization pattern by minute pixels within at least one of four multi-value processed pixels (left, top, upper right, and upper left) adjacent to the target pixel.

5. The image processing method according to claim 3, wherein the first step refers to multi-value image data of at least one of four unprocessed multi-value pixels (right, lower, lower left, and lower right) adjacent to the target pixel.

6. The image processing method according to claim 3, wherein, in judging creation of the dot having k number of minute pixels or more to serve as a base point for starting dot reproduction, in the first step, one threshold value and polarity of the correction data are used as a judgment criteria.

7. The image processing method according to claim 3, wherein the dot having k number of minute pixels or more serves as a base point for starting dot reproduction.

8. The image processing method according to claim 7, wherein the first step randomly changes the number of minute pixels to be created as the dot having k number of minute pixels or more for each of processing multi-value pixels.

9. The image processing method according to claim 1, wherein the first step forms the dot having k number of minute pixels or more toward a multi-value pixel to be processed later.

10. The image processing method according to claim 1, wherein the first step forms the dot having less than k number of minute pixels so that black or white minute pixels collect in the dot.

11. The image processing method according to claim 10, wherein the first step forms the dot so that black minute pixels collect in the dot when a value of the multi-value image data or the correction image data is a low density, and forms the dot so that white minute pixels collect in the dot when a high density.

12. The image processing method according to claim 1, wherein the first step makes all minute pixels of the n by m minute pixel matrix uncolored when a value of at least one of the multi-value image data and the correction image data is smaller than a first judgment value.

13. An image processing method that puts input image data represented by multi-values into gradation representation by binary data of plural minute pixels while performing error diffusion processing, wherein:
when a dot is formed which corresponds to correction image data produced by adding correction data to multi-value image data of a multi-value target pixel, the multi-value image data is gradation-represented by binary data of n by m (n×m>1, n and m are integers, respectively) number of minute pixels perdot;
multi-value pixel data in the vicinity of the target pixel and the correction image data are referred to, and an n-by-in minute pixel matrix is divided into at least six patterns to form a dot as follows:
(1) all minute pixels are made uncolored;
(2) all minute pixels are colored;
(3) of n by m minute pixels, K number or greater minute pixels at proper locations are colored;
(4) of n by m minute pixels, K number or greater minute pixels at proper locations are uncolored;
(5) of n by m minute pixels, a number of minute pixels in accordance with the density of the correction image data, including a minute pixel at a location adjacent to the pattern (3), are colored; and
(6) of n by m minute pixels, a number of minute pixels in accordance with the density of the correction image data, including a minute pixel at a location adjacent to the pattern (4), are made uncolored; and
if a value of at least one of the multi-value image data and the correction image data falls within a predetermine range, multi-value pixel data in the vicinity of the target pixel and the correction image data are referred to, and dot formation with the n by m minute pixel matrix divided into at least the six patterns is changed at a predetermined ratio.

14. The image processing method according to claim 13, wherein the predetermined ratio is changed using a flag indicating whether dot formation within the predetermined range is valid or invalid.

15. A method of processing multi-valued image data into binary image data, the method comprising:
selecting a multi-value target pixel from a plurality of multi-value pixels which represent multi-value image data;
forming a dot of binary data represented by minute pixels corresponding to the target pixel, wherein the dot may contain less than k minute pixels (k being an integer of 2 or greater) if the dot is formed adjacent to a previously formed dot corresponding to another multi-value pixel;
otherwise forming the dot containing k number of minute pixels or more;
adding correction data to the multi-value image data of the target pixel to produce correction image data of the target pixel; and
determining the value of k and the number of binary pixels in the dot from the correction image data.

16. The method according to claim 15 comprising:
forming the dot having k number of minute pixels or more in correspondence with the target pixel if the correction image data is equal to or greater than a predetermined value, wherein the dot is to be used as a core dot which serves as a base point for dot reproduction; and
forming the dot which may contain less than k number of minute pixels if the correction image data is less than the predetermined value, wherein the dot is to be used as a sub-dot which is formed adjacent to previously formed core dot.

17. An image processing apparatus that puts input image data represented by multi-value pixels into gradation representation of dots having binary data of plural minute pixels while performing error diffusion processing, comprising:
a dot forming unit that, when a dot is formed which corresponds to correction image data produced by adding correction data to multi-value image data of a multi-value target pixel, only in the case where the dot is to be formed so as to be adjacent to a dot formed for a proper adjacent multi-value pixel, forms the dot even if it has less than k (2 or greater integer) number of minute pixels, and in other cases, forms only a dot having k number or minute pixels or more; and
an error diffusion processing unit that calculates an error between a density of the correction image data and a density of the dot formed by the dot forming unit and uses the density error information as the correction data or peripheral multi-value pixels.

18. The image processing apparatus according to claim 17, wherein:
the multi-value image data is gradation-represented by binary data of n by m (n×m>1, n and m are integers, respectively) number of minute pixels perdot; and the dot forming unit refers to pixel data in the vicinity of the target pixel and the correction image data, and divides an n-by-in minute pixel matrix into at least six patterns to form a dot as follows:
(1) all minute pixels are made uncolored;
(2) all minute pixels are colored;
(3) of n by m minute pixels, K number or greater minute pixels at proper locations are colored;
(4) of n by m minute pixels, K number or greater minute pixels at proper locations are uncolored;
(5) of n by m minute pixels, a number of minute pixels in accordance with the density of the correction image data, including a minute pixel at a location adjacent to the pattern (3), are colored; and
(6) of n by m minute pixels, a number of minute pixels in accordance with the density of the correction image data, including a minute pixel at a location adjacent to the pattern (4), are made uncolored.

19. The image processing apparatus according to claim 18, wherein the dot forming unit, if a value of the correction image data falls within a predetermine range, refers to multi-value pixel data in the vicinity of the target pixel and the correction image data, and changes dot formation with the n-by-in minute pixel matrix divided into at least the six patterns at a predetermined ratio.

* * * * *